United States Patent
Miyabe et al.

(10) Patent No.: US 10,066,099 B2
(45) Date of Patent: Sep. 4, 2018

(54) POLYESTER-BASED RESIN COMPOSITION, AND MOLDED BODY USING THE RESIN COMPOSITION

(71) Applicant: Mitsubishi Gas Chemical Company, Inc., Tokyo (JP)

(72) Inventors: Takanori Miyabe, Kanagawa (JP); Takafumi Oda, Kanagawa (JP); Tomonori Kato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 15/107,196

(22) PCT Filed: Dec. 22, 2014

(86) PCT No.: PCT/JP2014/083948
§ 371 (c)(1),
(2) Date: Jun. 22, 2016

(87) PCT Pub. No.: WO2015/098862
PCT Pub. Date: Jul. 2, 2015

(65) Prior Publication Data
US 2017/0037239 A1    Feb. 9, 2017

(30) Foreign Application Priority Data

Dec. 25, 2013 (JP) .................. 2013-267263
Dec. 25, 2013 (JP) .................. 2013-267272

(51) Int. Cl.
| | | |
|---|---|---|
| C08L 67/00 | (2006.01) | |
| C08L 77/00 | (2006.01) | |
| C08L 67/02 | (2006.01) | |
| B29C 49/00 | (2006.01) | |
| B29K 33/04 | (2006.01) | |
| B29L 31/00 | (2006.01) | |

(52) U.S. Cl.
CPC .......... *C08L 67/02* (2013.01); *B29C 49/0005* (2013.01); *B29K 2033/04* (2013.01); *B29L 2031/7158* (2013.01); *C08L 2203/10* (2013.01); *C08L 2205/025* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| | | |
|---|---|---|
| 2002/0173591 A1 | 11/2002 | Chisholm et al. |
| 2003/0068455 A1 | 4/2003 | Oguro et al. |
| 2006/0199919 A1 | 9/2006 | Hale et al. |
| 2010/0233405 A1 | 9/2010 | Andrews et al. |
| 2015/0030793 A1 | 1/2015 | Miyabe et al. |

FOREIGN PATENT DOCUMENTS

| | | |
|---|---|---|
| CN | 1396208 A | 2/2003 |
| CN | 101784606 A | 7/2010 |
| CN | 102348762 A | 2/2012 |
| JP | 2008-531830 A | 8/2008 |
| JP | 2008-239993 A | 10/2008 |
| JP | 4573060 A | 10/2008 |
| JP | 2011-037989 A | 2/2011 |
| JP | 2011-132394 A | 7/2011 |
| JP | 2013-185138 A | 9/2013 |
| WO | 2009-024609 A1 | 2/2009 |
| WO | WO 2013/133352 A1 * | 9/2013 |

OTHER PUBLICATIONS

International Search Report dated Jan. 27, 2015 for PCT/JP2014/083948 and English translation of the same (5 pages).

* cited by examiner

*Primary Examiner* — Ana L Woodward
(74) *Attorney, Agent, or Firm* — Fitch, Even, Tabin & Flannery LLP

(57) ABSTRACT

A polyester-based resin composition containing a polyester resin (A) that has a dicarboxylic acid unit containing units selected from a sulfophthalic acid unit and a sulfophthalic acid metal salt unit in a total amount of 0.01 to 15.0 mol % and a diol unit, a polyester resin (B) having a cyclic acetal structure or an alicyclic hydrocarbon structure, and a polyamide resin (C), wherein the content of the polyester resin (B) in the resin composition is 0.5 to 15.0% by mass.

15 Claims, No Drawings

POLYESTER-BASED RESIN COMPOSITION, AND MOLDED BODY USING THE RESIN COMPOSITION

CROSS-REFERENCE TO RELATED APPLICATIONS

This application is a U.S. national phase application filed under 35 U.S.C. § 371 of International Application PCT/JP2014/083948, filed on Dec. 22, 2014, designating the United States, which claims priority from Japanese Application Numbers 2013-267263 and 2013-267272, each filed Dec. 25, 2013, which are hereby incorporated herein by reference in their entirety.

FIELD OF THE INVENTION

The present invention relates to a polyester-based resin composition and a molded article using the resin composition.

BACKGROUND OF THE INVENTION

Polymers obtained using an aromatic dicarboxylic acid and an aliphatic diol compound as monomers, for example, polyesters typified by polyethylene terephthalate (PET) and others are excellent in transparency, mechanical properties, melt stability, flavor retention, recyclability, etc. Thus, currently, such polymers are widely used as various wrapping/packaging materials such as films, sheets, hollow containers, etc.

However, since polyesters are not always sufficient in point of gas-barrier performance against oxygen, carbon dioxide and the like, use of polyesters as packaging containers is limited.

There have been employed some methods for improving the gas-barrier performance of polyesters. One method includes coating a molded article and a package container made of polyester with aluminum oxide or silicon oxide through vapor deposition. Another method includes coating a molded article and a package container made of polyester with a resin having gas-barrier performance higher than that of polyester. However, such coating methods have problems, such as addition of a cumbersome step to production of target polyester articles, and impairment in recyclability and mechanical properties of polyester products. Thus, limitation is imposed on carrying out such methods.

One method for easily improving the gas-barrier performance of polyesters while solving the aforementioned problems includes melt-mixing of a polyester resin with a thermoplastic resin having high gas-barrier performance. An example of the resin having such high gas-barrier performance is an ethylene-vinyl alcohol copolymer resin. The ethylene-vinyl alcohol copolymer resin has poor compatibility with polyester, due to a characteristic intrinsic to the molecular structure thereof. When the two resins are mixed together, the formed resin composition assumes a turbid state, impairing transparency, which is a merit of polyester. When an ethylene-vinyl alcohol copolymer resin is processed at a temperature suitable for processing polyethylene terephthalate, which is one of the most generally used polyesters, the ethylene-vinyl alcohol copolymer resin rapidly deteriorates. In some case, gelation and scorching occur, and the formed undesired matter is incorporated into final products, possibly impairing appearance and yield of the products. In addition, in order to remove the undesired matter from a production machine, disassembly and cleaning of the machine must be frequently carried out. Thus, difficulty is encountered in carrying out, on an industrial scale, the technique using ethylene-vinyl alcohol copolymer resin.

Examples of other gas-barrier resins than ethylene-vinyl alcohol copolymers include polyamides, typically nylon 6 and nylon 66.

Among such polyamide resins, polymetaxylyleneadipamide (MXD6), which is formed through polymerization of a diamine component mainly including metaxylylenediamine and a dicarboxylic acid component mainly including adipic acid, is a polyamide resin especially excellent in gas-barrier performance. Polymetaxylyleneadipamide has a glass transition temperature, a melting point and crystallinity that are almost equivalent to those of polyethylene terephthalate, which is one of the most generally used polyesters, and in addition, the heat stability thereof in melting is excellent and the processability thereof is good.

From these points, polymetaxylyleneadipamide can be said to be a resin particularly suitable as a material for improving gas-barrier performance of polyesters.

However, a molded article produced using a resin composition containing a polyester and a polymetaxylyleneadipamide is insufficient in point of transparency, and its use in applications requiring high transparency is therefore limitative.

PTLs 1 and 2 disclose a resin composition containing a polyester and a polymetaxylyleneadipamide, and intend to provide such a resin composition capable of solving the above-mentioned problems and capable of being a molding material for a molded article having high transparency by using a modified polyester that is modified with cyclohexanedimethanol (CHDM) or spiroglycol (SPG) as the polyester.

CITATION LIST

Patent Literature

PTL 1: JP-T 2008-531830
PTL 2: Japanese Patent 4573060

SUMMARY OF INVENTION

However, the molded article using the resin composition described in PTLs 1 and 2 could have relatively good transparency in the portion thereof having a low draw ratio of less than 5 times, but has a problem in that, in the portion thereof having a draw ratio of 5 times or more, the haze (turbidity) increases and therefore the transparency is poor.

An object of the present invention is to provide a polyester-based resin composition capable of being a molding material for a molded article that has excellent transparency in any portion thereof having a low draw ratio or having a high draw ratio, and has good gas-barrier performance, and to provide a molded article using the resin composition.

The present inventors have made assiduous studies and, as a result, have found that a molded article using a resin composition that contains, along with a polyamide resin, two types of polyester resins having specific units each in a predetermined content has excellent transparency in any portion thereof having a low draw ratio or having a high draw ratio, while keeping good gas-barrier performance.

Specifically, the present invention relates to the following <1> to <17>:
<1> A polyester-based resin composition containing a polyester resin (A) that has a dicarboxylic acid unit containing units selected from a sulfophthalic acid unit and a sulfophthalic acid metal salt unit in a total amount of 0.01 to 15.0 mol % and a diol unit, a polyester resin (B) having a cyclic acetal structure or an alicyclic hydrocarbon structure, and a polyamide resin (C), wherein the content of the polyester resin (B) in the resin composition is 0.5 to 15.0% by mass.

<2> The polyester-based resin composition according to the above <1>, wherein the polyester resin (A) has a dicarboxylic acid unit containing units selected from a sulfoisophthalic acid unit and a sulfoisophthalic acid metal salt unit in a total amount of 0.01 to 15.0 mol % and a terephthalic acid unit in an amount of 70 mol % or more, and a diol unit containing an aliphatic glycol unit having 2 to 24 carbon atoms in an amount of 70 mol % or more.

<3> The polyester-based resin composition according to the above <1> or (2), wherein the polyester resin (A) has a dicarboxylic acid unit containing a sulfoisophthalic acid metal salt unit in an amount of 0.01 to 15.0 mol %, an isophthalic acid unit in an amount of 1 to 10 mol % and a terephthalic acid unit in an amount of 70 mol % or more, and a diol unit containing an aliphatic glycol unit having 2 to 6 carbon atoms in an amount of 70 mol % or more.

<4> The polyester-based resin composition according to any of the above <1> to <3>, wherein the content of the polyester resin (A) in the resin composition is 75.0 to 99.0% by mass.

<5> The polyester-based resin composition according to any of the above <1> to <4>, wherein the polyester resin (B) is a polyester resin having at least one of a dicarboxylic acid unit having a cyclic acetal structure and a diol unit having a cyclic acetal structure.

<6> The polyester-based resin composition according to the above <5>, wherein the diol unit having a cyclic acetal structure is derived from a compound represented by the following general formula (1) or (2):

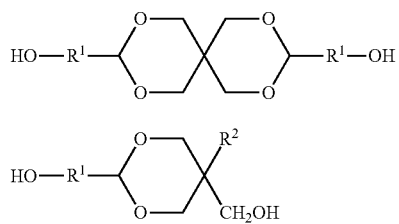

wherein $R^1$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms, and $R^2$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

<7> The polyester-based resin composition according to the above <5>, wherein the dicarboxylic acid unit having a cyclic acetal structure is derived from a compound represented by the following general formula (3) or (4):

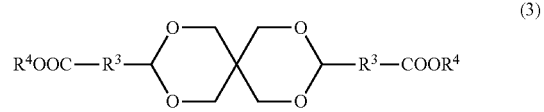

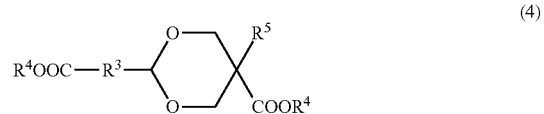

wherein $R^3$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms; $R^4$ each independently represents a hydrogen atom, a methyl group, an ethyl group, or an isopropyl group; and $R^5$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

<8> The polyester-based resin composition according to any of the above <1> to <4>, wherein the polyester resin (B) is a polyester resin having at least one of a dicarboxylic acid unit having an alicyclic hydrocarbon structure and a diol unit having an alicyclic hydrocarbon structure.

<9> The polyester-based resin composition according to the above <8>, wherein the alicyclic hydrocarbon structure is a cycloalkane structure having 3 to 10 carbon atoms.

<10> The polyester-based resin composition according to the above <8> or <9>, wherein the diol unit having an alicyclic hydrocarbon structure is derived from a compound represented by the following general formula (5):

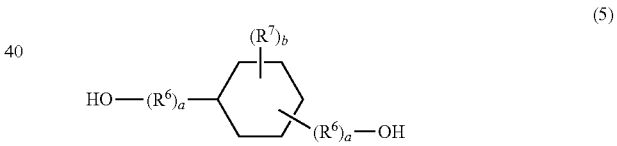

wherein $R^6$ each independently represents a divalent aliphatic group having 1 to 10 carbon atoms; $R^7$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms; and a indicates 0 or 1, and when a=0, the hydroxyl group directly bonds to the cyclohexane ring; b indicates an integer of 0 to 4.

<11> The polyester-based resin composition according to the above <8> or <9>, wherein the dicarboxylic acid unit having an alicyclic hydrocarbon structure is derived from a compound represented by the following general formula (6):

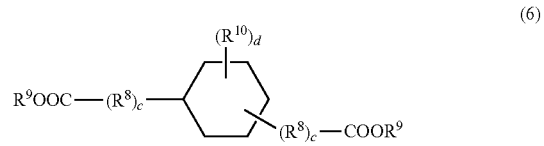

wherein $R^8$ each independently represents a divalent aliphatic group having 1 to 10 carbon atoms; $R^9$ each independently a hydrogen atom, a methyl group, an ethyl group, or an isopropyl group; $R^{10}$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms; and c indicates 0 or 1, and when c=0, the group —COOR$^9$ directly bonds to the cyclohexane ring; d indicates an integer of 0 to 4.

<12> The polyester-based resin composition according to any of the above <1> to <11>, wherein the polyamide resin (C) is a polyamide resin (C1) that has a diamine unit containing a metaxylylenediamine unit in an amount of 70 mol % or more and a dicarboxylic acid unit containing an α,ω-aliphatic dicarboxylic acid unit in an amount of 70 mol % or more.

<13> The polyester-based resin composition according to any of the above <1> to <12>, wherein the content of the polyamide resin (C) in the resin composition is 0.5 to 10.0% by mass.

<14> A molded article having at least one layer formed of the polyester-based resin composition of any of the above <1> to <13>.

<15> The molded article according to the above <14>, which is a bottle, a cup, a film or a sheet.

<16> The molded article according to the above <14> or <15>, wherein the molded article has a portion stretched in a draw ratio of 5 to 20 times.

<17> The molded article according to the above <16>, wherein the number average value of the major diameter of the disperse particles of the polyamide resin (C) in the portion stretched by 5 to 20 times is 1.0 to 8.0 μm and the number average value of the minor diameter thereof is 0.01 to 0.50 μm.

The molded article using the polyester-based resin composition of the present invention has excellent transparency in any portion thereof having a low draw ratio or having a high draw ratio, and has good gas-barrier performance.

DESCRIPTION OF EMBODIMENTS

[Resin Composition]

The polyester-based resin composition of the present invention (also hereinafter referred to as "the resin composition of the present invention") contains a polyester resin (A) that has a dicarboxylic acid unit containing units selected from a sulfophthalic acid unit and a sulfophthalic acid metal salt unit in a total amount of 0.01 to 15.0 mol % and a diol unit, a polyester resin (B) having a cyclic acetal structure or an alicyclic hydrocarbon structure, and a polyamide resin (C).

The polyester resin (B) may be grouped into a polyester resin (B1) having a cyclic acetal structure and a polyester resin (B2) having an alicyclic hydrocarbon structure. Here, the polyester resin (B2) does not have a cyclic acetal structure.

The resin composition of the first embodiment of the present invention contains a polyester resin (A) that has a dicarboxylic acid unit containing units selected from a sulfophthalic acid unit and a sulfophthalic acid metal salt unit in a total amount of 0.01 to 15.0 mol % and a diol unit, a polyester resin (B1) having a cyclic acetal structure, and a polyamide resin (C).

The resin composition of the second embodiment of the present invention contains a polyester resin (A) that has a dicarboxylic acid unit containing units selected from a sulfophthalic acid unit and a sulfophthalic acid metal salt unit in a total amount of 0.01 to 15.0 mol % and a diol unit, a polyester resin (B2) having an alicyclic hydrocarbon structure (excepting those having a cyclic acetal structure), and a polyamide resin (C).

The reason why the molded article using the resin composition of the present invention has excellent transparency in any portion having a low draw ratio or having a high draw ratio is not always clear but may be presumed to be as follows.

In the case where an ordinary PET resin (polyethylene terephthalate resin) is blended with a polyamide resin (C) (for example, MXD6 such as MX nylon etc.), the resulting blend is transparent in an unstretched state since the refractive index of the polyethylene terephthalate resin is close to that of the polyamide resin (C). When stretched, however, the difference in the refractive index between the two increases and as a result, the blend loses transparency. Accordingly, when the polyester resin (B) having an alicyclic hydrocarbon structure is used as a polyester resin, the transparency in a stretched state of the resulting blend is improved, since, in the stretched state, the value of the refractive index of the polyester resin (B) is close to that of the polyamide resin (C). However, in an unstretched state, the difference in the refractive index between the polyester resin (B) and the polyamide resin (C) is large, and therefore the blend in the unstretched state loses transparency. Accordingly, by using the polyester resin (A) having at least one unit of a sulfophthalic acid unit and a sulfophthalic acid metal salt unit as an additional polyester resin, the transparency of the resulting blend in an unstretched state can be improved since the value of the refractive index of the polyester resin (A) is, in an unstretched state, close to that of the polyamide resin (C). On the other hand, in a stretched state, the difference in the refractive index between the polyester resin (A) and the polyamide resin (C) is large and, as a result, the blend is expected to lose transparency, but the polyamide resin (C) is finely dispersed by the polyester resin (A) having at least one unit of a sulfophthalic acid unit and a sulfophthalic acid metal salt unit and, as a result, it is presumed that, even after stretched, the blend can still maintain good transparency.

The constituent components contained in the resin composition of the present invention are described below.

<Polyester Resin (A)>

From the viewpoint of obtaining a resin composition that is a molding material capable of improving the transparency of the molded article thereof, the resin composition of the present invention contains a polyester resin (A) that has a dicarboxylic acid unit containing at least one unit of a sulfophthalic acid unit and a sulfophthalic acid metal salt unit, with the total amount thereof being 0.01 to 15.0 mol %, and a diol unit.

The total content of the units selected from the sulfophthalic acid unit and the sulfophthalic acid metal salt unit in the polyester resin (A) is 0.01 to 15.0 mol % relative to the total amount of the dicarboxylic acid units, but is preferably 0.03 to 10.0 mol %, more preferably 0.06 to 5.0 mol %, even more preferably 0.08 to 1.0 mol %.

When the content is less than 0.01 mol %, the transparency of the molded article using the resultant resin composition is low. On the other hand, when more than 15.0 mol %, the melting point of the polyester resin (A) lowers and the crystallinity thereof lowers. As a result, the molding workability of the resultant resin composition worsens.

The polyester resin (A) contains at least one unit of a sulfophthalic acid unit and a sulfophthalic acid metal salt unit, but preferably contains a sulfophthalic acid metal salt unit.

The sulfophthalic acid unit or the sulfophthalic acid metal salt unit contained in the polyester resin (A) is a unit represented by the following general formula (I) or (I'), respectively. The sulfophthalic acid unit or sulfophthalic acid metal salt unit may be formed through polymerization to give the polyester resin (A) using a compound such as a sulfophthalic acid or a metal salt thereof, an ester thereof or the like as a monomer.

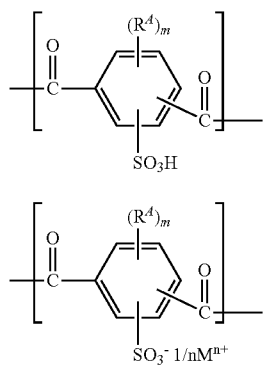

In the above general formula (I'), M represents a metal atom. n indicates the atomic valence of M.

Examples of the metal atom of M include alkali metals such as lithium, sodium, potassium, etc.; alkaline earth metals such as beryllium, magnesium, calcium, strontium, etc. Above all, alkali metals are preferred, sodium or lithium is preferred, and sodium is more preferred. When n is 2 or more, the unit may be crosslinked with any other unit (for example, a sulfo group of any other sulfophthalic acid unit or sulfophthalic acid metal salt unit) via M.

In the above general formulae (I) and (I'), $R^A$ represents a substituted or unsubstituted alkyl group, or a substituted or unsubstituted aryl group. m indicates an integer of 0 to 3. When m is 2 or 3, $R^A$'s may be the same as or different from each other.

Examples of the alkyl group include a methyl group, an ethyl group, an n-propyl group, an isopropyl group, an n-butyl group, a t-butyl group, an n-octyl group, a 2-ethylhexyl group, etc. Among these, an alkyl group having 1 to 6 carbon atoms is preferred, and an alkyl group having 1 to 4 carbon atoms is more preferred.

Examples of the aryl group include a phenyl group, a naphthyl group, etc. Among these, an aryl group having 6 to 12 carbon atoms is preferred, and a phenyl group is more preferred.

Examples of the substituent that the above alkyl group and aryl group may have include a halogen atom such as a chlorine atom, a bromine atom, an iodine atom, etc., an alkyl group, an alkenyl group, an aryl group, a cyano group, a hydroxyl group, a nitro group, an alkoxy group, an aryloxy group, an acyl group, an amino group, a mercapto group, an alkylthio group, an arylthio group, etc. Among the groups, those having a hydrogen atom may be further substituted with the above-mentioned substituent.

Examples of $R^A$ include a methyl group, an ethyl group, an n-propyl group, an isopropyl group, an n-butyl group, a t-butyl group, a 1-methylpropyl group, a 2-methylpropyl group, a hydroxymethyl group, a 1-hydroxyethyl group, a mercaptomethyl group, a methylthioethyl group, a phenyl group, a naphthyl group, a biphenyl group, a benzyl group, a 4-hydroxybenzyl group; and among these, a methyl group, an ethyl group and a benzyl group are preferred.

Preferred examples of $R^A$ are as described above, but the sulfophthalic acid unit or sulfophthalic acid metal salt unit contained in the polyester resin (A) is preferably those where m=0, that is, those in which the benzene ring does not have $R^A$ as a substituent, namely the unit represented by the following general formula (Ia) or (I'a).

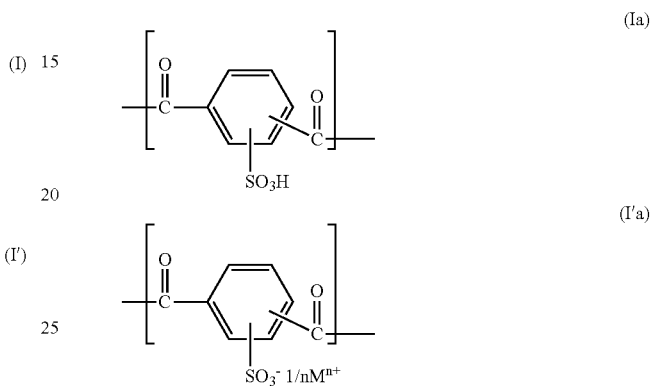

In the above general formula (I'a), M and n are the same as M and n in the above general formula (I').

Further, the sulfophthalic acid unit represented by the above general formula (Ia), or the sulfophthalic acid metal salt unit represented by the above general formula (I'a) include a phthalic acid structure where the two (—CO—)'s bond at the ortho-position to each other, an isophthalic acid structure where the two bond at the meta-position to each other, and a terephthalic acid structure where the two bond at the para-position to each other; and above all, the isophthalic acid structure is preferred. Namely, it is preferred to contain at least one unit of a sulfoisophthalic acid unit represented by the following general formula (Ib), and a sulfoisophthalic acid metal salt unit represented by the following general formula (I'b).

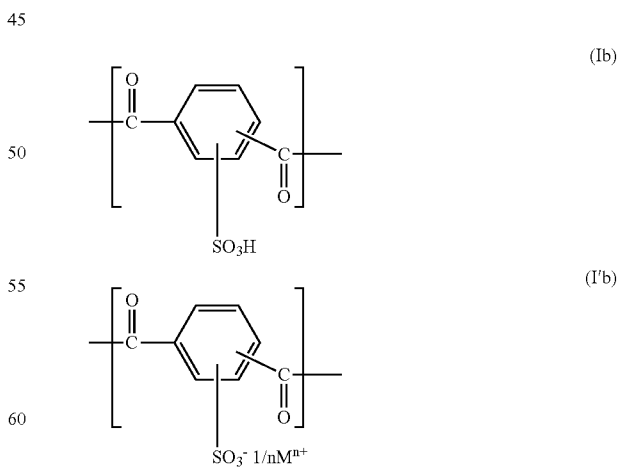

In the above general formula (I'b), M and n are the same as M and n in the above general formula (I').

Regarding the position thereof, the sulfo group in the sulfophthalic acid unit or the sulfophthalic acid metal salt unit may be at any position of 2, 4, 5 and 6-positions, but those represented by the following formula (Ic) or (I'c) where the sulfo group is at 5-position are preferred.

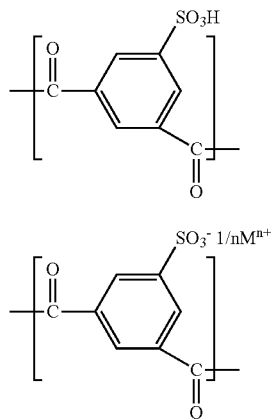

In the above general formula (I'c), M and n are the same as M and n in the general formula (I').

Examples of the compound capable of constituting the sulfophthalic acid unit or the sulfophthalic acid metal salt unit represented by the above general formula (Ic) or (I'c) in the polyester resin (A) include 5-sulfoisophthalic acid, sodium 5-sulfoisophthalate, lithium 5-sulfoisophthalate, potassium 5-sulfoisophthalate, calcium bis(5-sulfoisophthalate), dimethyl sodium 5-sulfoisophthalate, diethyl sodium 5-sulfoisophthalate, etc.

Examples of dicarboxylic acid units other than the sulfophthalic acid unit and the sulfophthalic acid metal salt unit to be contained in the polyester resin (A) include an aromatic dicarboxylic acid unit and an aliphatic carboxylic acid unit other than the sulfophthalic acid unit and the sulfophthalic acid metal salt unit, and an aromatic dicarboxylic acid unit is preferably contained.

In the case where the polyester resin (A) contains any other aromatic dicarboxylic acid units than the sulfophthalic acid unit and the sulfophthalic acid metal salt unit, the content of the aromatic dicarboxylic acid units including the sulfophthalic acid unit and the sulfophthalic acid metal salt unit in the dicarboxylic acid units is preferably 70 mol % or more, more preferably 80 mol % or more, even more preferably 90 mol % or more, and is preferably 100 mol % or less.

Examples of the compound capable of constituting the other aromatic dicarboxylic acid units than the sulfophthalic acid unit and the sulfophthalic acid metal salt unit in the polyester resin (A) include a dicarboxylic acid having an aromatic nucleus such as benzene, naphthalene, diphenyl, oxydiphenyl, sulfonyldiphenyl, methylenediphenyl or the like (aromatic dicarboxylic acid) and a derivative thereof. Examples of the aromatic dicarboxylic acid derivative include esters formed of an aromatic dicarboxylic acid and an alcohol having 1 to 3 carbon atoms.

Among these, terephthalic acid, isophthalic acid, naphthalenedicarboxylic acids such as 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, etc., and 4,4'-biphenyldicarboxylic acid, 3,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, anthracenedicarboxylic acid and the like, and $C_{1-3}$ short-chain alkyl esters of these acids are preferred; terephthalic acid, isophthalic acid, 2,6-naphthalenedicarboxylic acid, 4,4'-biphenyldicarboxylic acid and their methyl esters and ethyl ethers are more preferred; terephthalic acid, isophthalic acid and their methyl esters are even more preferred; and terephthalic acid is most preferred.

Preferably, from the viewpoint of molding workability, the polyester resin (A) contains an isophthalic acid unit along with the sulfophthalic acid unit and the sulfophthalic acid metal salt unit. In the case where the polyester resin (A) contains an isophthalic acid unit, the content of the isophthalic acid unit in the dicarboxylic acid unit therein is preferably 1 to 10 mol %, more preferably 1 to 8 mol %, even more preferably 1 to 6 mol %.

The polyester resin containing an isophthalic acid unit in the amount mentioned above in the dicarboxylic acid unit therein can suitably lower the crystallinity thereof, therefore improving the molding workability of the resin composition of the present invention.

Examples of the compound capable of constituting the aliphatic dicarboxylic acid unit that are contained in the polyester resin (A) include succinic acid, glutaric acid, adipic acid, pimelic acid, suberic acid, azelaic acid, sebacic acid, dodecanedicarboxylic acid, etc.

The polyester resin (A) may contain, within a range not detracting from the advantageous effects of the present invention, a monocarboxylic acid unit derived from benzoic acid, propionic acid, butyric acid or the like, and a polycarboxylic acid unit derived from tri or more polycarboxylic acids or acid anhydrides such as trimellitic acid, pyromellitic acid, trimellitic anhydride, pyromellitic anhydride, etc., in addition to the dicarboxylic acid unit.

As the diol unit to be contained in the polyester resin (A), the polyester resin (A) may include an aliphatic glycol unit, an alicyclic diol unit and an aromatic diol unit, an aliphatic glycol unit and an alicyclic diol unit are preferred, and an aliphatic glycol unit is more preferred.

In the case where the polyester resin (A) contains an aliphatic glycol unit, the content of the aliphatic glycol unit therein is, from the viewpoint of the crystallinity of the polyester resin and of easiness in drying the resin before use, preferably 70 mol % or more, more preferably 80 mol % or more, even more preferably 90 mol % or more, and is preferably 100 mol % or less, relative to the total amount of the diol units.

The carbon number of the aliphatic glycol is preferably 2 to 24, more preferably 2 to 12, even more preferably 2 to 6. Specific examples of the compound capable of constituting the aliphatic diol unit include ethylene glycol, 1,2-propylene glycol, 1,3-propylene glycol, 1,4-butylene glycol, diethylene glycol, triethylene glycol, 1,2-butylene glycol, 1,3-butylene glycol, 2,3-butylene glycol, 1,5-pentanediol, neopentyl glycol, 1,6-hexanediol, etc. Above all, ethylene glycol and 1,4-butylene glycol are preferred, and ethylene glycol is more preferred.

The carbon number of the alicyclic diol is preferably 6 to 24, more preferably 6 to 12, even more preferably 6 to 10. Specific examples of the compound capable of constituting the alicyclic diol unit include 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, etc.

The carbon number of the aromatic diol unit is preferably 6 to 20, more preferably 6 to 20. Specific examples of the compound capable of constituting the aromatic diol unit include hydroquinone, 4,4'-dihydroxybisphenol, 1,4-bis(β- hydroxyethoxy)benzene, 1,4-bis(β-hydroxyethoxyphenyl) sulfone, bis(p-hydroxyphenyl) ether, bis(p-hydroxyphenyl) sulfone, bis(p-hydroxyphenyl)methane, 1,2-bis(p-hydroxyphenypethane, bisphenol A, bisphenol C, 2,5-naphthalenediol, glycols produced by adding ethyleneoxide to these glycols, etc.

The polyester resin (A) may contain, within a range not detracting from the advantageous effects of the present invention, a monoalcohol unit derived from butyl alcohol, hexyl alcohol, octyl alcohol, etc., a tri or more polyalcohol unit derived from trimethylolpropane, glycerin, pentaerythritol, etc., or the like, in addition to the diol unit.

The polyester resin (A) is obtained through polycondensation of a dicarboxylic acid component to constitute a dicarboxylic acid unit and a diol component to constitute a diol unit, and for its production, any known direct esterification method or interesterification method is employable.

Examples of the polycondensation catalyst for use in producing the polyester resin (A) include known antimony compounds such as antimony trioxide, antimony pentoxide, etc., germanium compounds such as germanium oxide, etc. If desired, for increasing the molecular weight thereof, the resin may be produced through solid-phase polymerization according to a conventionally-known method.

In the present invention, the polyester resin (A) preferably contains a dicarboxylic acid unit containing units selected from a sulfophthalic acid unit and a sulfophthalic acid metal salt unit in a total amount of 0.01 to 15.0 mol % and a terephthalic acid unit in an amount of 70 mol % or more, and a diol unit containing an aliphatic glycol unit having 2 to 24 carbon atoms in an amount of 70 mol % or more. More preferably, the polyester resin (A) is a polyester that contains a dicarboxylic acid unit containing units selected from a sulfophthalic acid unit and a sulfophthalic acid metal salt unit in a total amount of 0.01 to 15.0 mol %, an isophthalic acid unit in an amount of 1 to 10 mol %, and a terephthalic acid unit in an amount of 70 mol % or more, and a diol unit containing an aliphatic glycol unit having 2 to 6 carbon atoms in an amount of 70 mol % or more.

Preferred examples of the polyester resin (A) in the present invention include polyesters selected from polyethylene terephthalate, ethylene terephthalate-isophthalate copolymer, ethylene-1,4-cyclohexanedimethylene-terephthalate copolymer, poly ethylene-2,6-naphthalene-dicarboxylate, ethylene-2,6-naphthalene-dicarboxylate-terephthalate copolymer and ethylene-terephthalate-4,4'-biphenyldicarboxylate copolymer, and containing at least one unit of a sulfophthalic acid and a sulfophthalic acid metal salt unit.

Among these, a polyester having a sulfophthalic acid and/or its metal salt unit in polyethylene terephthalate, or a polyester having a sulfophthalic acid and/or its metal salt unit in an ethylene-terephthalate-isophthalate copolymer are more preferred.

The polyester resin (A) for use in the present invention is preferably dried before use so as to have a water content of preferably 200 ppm or less, more preferably 100 ppm or less, even more preferably 50 ppm or less.

The intrinsic viscosity (value measured in a mixed solvent of phenol/1,1,2,2-tetrachloroethane=60/40 by mass, at 25° C.) of the polyester resin (A) for use in the present invention is preferably 0.60 to 2.00 dl/g, more preferably 0.70 to 1.80 dl/g.

When the limiting viscosity falls within the above range, the molecular weight of the polyester is sufficiently high and the viscosity thereof in melt is not too high, and therefore realizing a resin composition having good molding workability. In addition, the mechanical properties of the molded article using the resin composition are also good.

The content of the polyester resin (A) in the resin composition of the present invention is preferably 75.0 to 99.0% by mass, more preferably 75.0 to 95.0% by mass, even more preferably 80.0 to 93.0% by mass, still more preferably 85.0 to 92.5% by mass.

When the content is 75.0% by mass or more, the molding workability of the resin composition is good, and the gas-barrier performance of the molded article using the resin composition is bettered.

<Polyester Resin (B)>

The resin composition of the present invention contains, from the viewpoint of realizing a resin composition to be a molding material capable of improving the transparency of the molded article thereof, a polyester resin (B) having a cyclic acetal structure or an alicyclic hydrocarbon structure in an amount of 0.5 to 15.0% by mass in the resin composition. The resin composition of the first embodiment of the present invention contains, as the polyester resin (B), a polyester resin (B1) having a cyclic acetal structure, and the resin composition of the second embodiment of the present invention contains, as the polyester resin (B), a polyester resin (B2) having an alicyclic hydrocarbon structure (excepting those having a cyclic acetal structure). Specifically, the polyester resin (B2) in the second embodiment of the present invention is a polyester resin having an alicyclic hydrocarbon structure, but excluding those having a cyclic acetal structure.

(Polyester Resin (B1))

The polyester resin (B1) is a polyester resin having at least one of a diol unit having a cyclic acetal structure and a dicarboxylic acid unit having a cyclic acetal structure.

The cyclic acetal structure in the polyester resin (B1) may be introduced as a diol unit derived from a diol component or a dicarboxylic acid unit derived from a dicarboxylic acid component, but is preferably introduced as a diol unit derived from a diol component. The reason is because it is considered that the cyclic acetal structure is not always stable against acid.

The diol component to constitute the diol unit having a cyclic acetal structure in the polyester resin (B1) is preferably a compound represented by the following general formula (1) or (2).

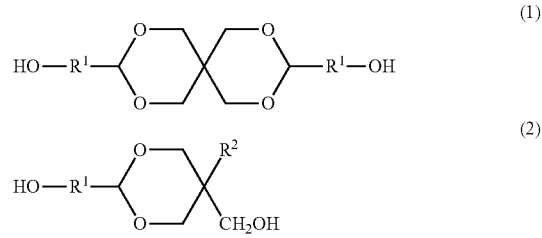

In the above general formulae (1) and (2), $R^1$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms.

In the above general formula (2), $R^2$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

In the case where $R^1$ is a divalent aliphatic group, examples of the divalent aliphatic group include a straight-chain or branched-chain alkylene group or alkenylene group, etc. The carbon number of the divalent aliphatic group is preferably 1 to 10, more preferably 1 to 4. For example, there are mentioned a methylene group, an ethylene group ($—CH_2CH_2—$), a propylidene group ($CH_3CH_2CH=$), a propylene group, ($—CH(CH_3)CH_2—$), a trimethylene group ($—CH_2CH_2CH_2—$), an isopropylidene group (($CH_3)_2C=$), a tetramethylene group ($—CH_2CH_2CH_2CH_2—$), a butylidene group ($CH_3CH_2CH_2CH=$), an isobutylidene group (($CH_3)_2CHCH=$), a sec-butylidene group ($CH_3CH_2C(CH_3)=$), an isobutylene group, ($—C(CH_3)_2—CH_2—$), etc. Among these, $R^1$ is preferably an isobutylene group from the viewpoint of the transparency of the resin composition of the present invention.

When $R^1$ is a divalent alicyclic group, examples of the divalent alicyclic group include a cycloalkylene group, etc. The carbon number of the divalent alicyclic group is preferably 3 to 12, more preferably 6 to 9.

When $R^1$ is a divalent aromatic group, examples of the divalent aromatic group include an arylene group such as a phenylene group, a biphenylene group, a naphthylene group, etc. The carbon number of the divalent aromatic group is preferably 6 to 18, more preferably 6 to 12.

When $R^2$ is a monovalent aliphatic group, examples of the monovalent aliphatic group include a straight-chain or branched-chain alkyl group or alkenyl group, etc. The carbon number of the monovalent aliphatic group is preferably 1 to 10, more preferably 1 to 4. For example, there are mentioned a methyl group, an ethyl group, an n-propyl group, an isopropyl group, an n-butyl group, a sec-butyl group, an isobutyl group, a tert-butyl group, etc.

When $R^2$ is a monovalent alicyclic group, examples of the monovalent alicyclic group include a cycloalkyl group, etc. The carbon number of the monovalent alicyclic group is preferably 3 to 12, more preferably 6 to 9.

When $R^2$ is a monovalent aromatic group, examples of the monovalent aromatic group include an aryl group such as a phenyl group, a biphenyl group, an naphthyl group, etc. The carbon number of the monovalent aromatic group is preferably from 6 to 18, more preferably from 6 to 12.

The above-mentioned aliphatic group, alicyclic group and aromatic group may be further substituted with a substituent.

Examples of the substituent include a halogen atom such as a chlorine atom, a bromine atom, an iodine atom, etc.; a cyano group, a hydroxyl group, a nitro group, an alkoxy group, an aryloxy group, an acyl group, an amino group, etc.

Specific examples of the compound represented by the general formula (1) include 3,9-bis(1,1-dimethyl-2-hydroxyethyl)-2,4,8,10-tetroxaspiro[5.5]undecane, and specific examples of the compound represented by the general formula (2) include 5-methylol-5-ethyl-2-(1,1-dimethyl-2-hydroxyethyl)-1,3-dioxane.

In the case where the polyester resin (B1) has a diol unit having a cyclic acetal structure, the content of the diol unit having a cyclic acetal structure is, from the viewpoint of maintaining the crystallinity of the resin and maintaining the molding workability thereof, preferably 0.5 to 50 mol %, more preferably 2 to 40 mol %, even more preferably 5 to 30 mol %, relative to the total amount of the diol units.

The dicarboxylic acid component to constitute the dicarboxylic acid unit having a cyclic acetal structure in the polyester resin (B1) is preferably a compound represented by the following general formula (3) or (4):

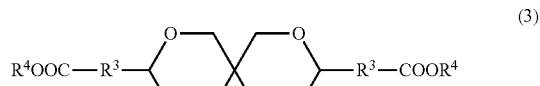

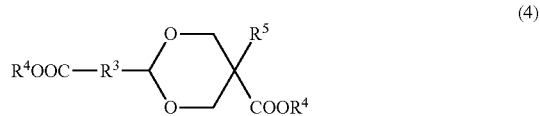

In the above general formulae (3) and (4), $R^3$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms; $R^4$ each independently represents a hydrogen atom, a methyl group, an ethyl group, or an isopropyl group.

In the above general formula (4), $R^5$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

Regarding specific examples of the above-mentioned divalent aliphatic group, divalent alicyclic group and divalent aromatic group, those exemplified for $R^1$ in the general formulae (1) and (2) are mentioned; and regarding the above-mentioned monovalent aliphatic group, monovalent alicyclic group and monovalent aromatic group, those exemplified for $R^2$ in the general formula (2) are mentioned.

Specific examples of the compound represented by the general formula (3) include 3,9-bis(1,1-dimethyl-2-carboxyethyl)-2,4,8,10-tetroxaspiro[5.5]undecane, 3,9-bis(2-carboxyethyl)-2,4,8,10-tetroxaspiro[5.5]undecane, etc.; and specific examples of the compound represented by the general formula (4) include 5-carboxy-5-ethyl-2-(1,1-dimethyl-2-carboxyethyl)-1,3-dioxane, 5-carboxy-5-ethyl-2-(2-carboxyethyl)-1,3-dioxane, etc.

In the case where the polyester resin (B1) has a dicarboxylic acid unit having a cyclic acetal structure, the content of the dicarboxylic acid unit having a cyclic acetal structure is, from the viewpoint of maintaining the crystallinity of the resin and maintaining the molding workability thereof, preferably 0.5 to 50 mol %, more preferably 2 to 40 mol %, even more preferably 5 to 30 mol %, relative to the total amount of the dicarboxylic acid units.

The polyester resin (B1) for use in the present invention may contain an aromatic dicarboxylic acid unit and an aliphatic dicarboxylic acid unit as any other dicarboxylic acid units than the dicarboxylic acid unit having a cyclic acetal structure, and preferably contains an aromatic dicarboxylic acid unit.

In the case where the polyester resin (B1) contains an aromatic dicarboxylic acid unit, the content of the aromatic dicarboxylic acid unit in the dicarboxylic acid unit therein is preferably 50 mol % or more, more preferably 60 mol % or more, even more preferably 70 mol % or more, and is preferably 100 mol % or less.

The compound capable of constituting the aromatic dicarboxylic acid unit that may be contained in the polyester resin (B1) includes a dicarboxylic acid having an aromatic nucleus such as benzene, naphthalene, diphenyl, oxydiphenyl, sulfonyldiphenyl, methylenediphenyl or the like, and derivatives thereof. Examples of the aromatic dicarboxylic acid derivative include esters formed of an aromatic dicarboxylic acid and an alcohol having 1 to 3 carbon atoms.

Among these, terephthalic acid, isophthalic acid, naphthalenedicarboxylic acids such as 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, etc., and 4,4'-biphenyldicarboxylic acid, 3,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, anthracenedicarboxylic acid and the like, and $C_{1-3}$ short-chain alkyl esters of these acids are preferred; terephthalic acid, isophthalic acid, 2,6-naphthalenedicarboxylic acid, 4,4'-biphenyldicarboxylic acid and their methyl esters and ethyl ethers are more preferred; terephthalic acid, isophthalic acid and their methyl esters are even more preferred; and terephthalic acid is most preferred.

Specific examples of the compound capable of constituting the aliphatic dicarboxylic acid unit that may be contained in the polyester resin (B1) include succinic acid, glutaric acid, adipic acid, pimelic acid, suberic acid, azelaic acid, sebacic acid, dodecanedicarboxylic acid, etc.

The polyester resin (B1) may contain, within a range not detracting from the advantageous effects of the present invention, a monocarboxylic acid unit, a tri or more polycarboxylic acid unit, a carboxylic acid anhydride unit, etc.

The polyester resin (B1) may contain, as any other diol units than the diol unit having a cyclic acetal structure therein, an aliphatic glycol unit, an alicyclic diol unit and an aromatic diol unit, and preferably contains an aliphatic glycol unit and an alicyclic diol unit, more preferably an aliphatic glycol unit.

In the case where the polyester resin (B1) contains an aliphatic glycol unit, the content of the aliphatic glycol unit in the diol unit therein is, from the viewpoint of the crystallinity of the polyester resin and the easiness in drying before use thereof, preferably 50 mol % or more, more preferably 60 mol % or more, even more preferably 70 mol % or more, and is preferably 99.5 mol % or less.

The carbon number of the aliphatic glycol unit that may be contained in the polyester resin (B1) is preferably 2 to 24, more preferably 2 to 6. Specific examples of the compound capable of constituting the aliphatic glycol unit include ethylene glycol, 1,2-propylene glycol, 1,3-propylene glycol, 1,4-butylene glycol, diethylene glycol, triethylene glycol, 1,2-butylene glycol, 1,3-butylene glycol, 2,3-butylene glycol, 1,5-pentanediol, neopentyl glycol, 1,6-hexanediol, etc. Above all, ethylene glycol, propylene glycol and 1,4-butylene glycol are preferred, and ethylene glycol is more preferred.

The carbon number of the alicyclic diol unit that may be contained in the polyester resin (B1) is preferably 3 to 24, more preferably 6 to 12, even more preferably 6 to 10. Specific examples of the compound capable of constituting the alicyclic diol unit include 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, etc.

The carbon number of the aromatic diol unit that may be contained in the polyester resin (B1) is preferably 6 to 24, more preferably 6 to 20. Specific examples of the compound capable of constituting the aromatic diol unit include hydroquinone, 4,4'-dihydroxybisphenol, 1,4-bis(β-hydroxy ethoxy)benzene, 1,4-bis(β-hydroxy ethoxy phenyl) sulfone, bis(p-hydroxyphenyl) ether, bis(p-hydroxyphenyl) sulfone, bis(p-hydroxyphenyl)methane, 1,2-bis(p-hydroxyphenyl) ethane, bisphenol A, bisphenol C, 2,5-naphthalenediol, glycols produced by adding ethyleneoxide to these glycols, etc.

The polyester resin (B1) may contain, within a range not detracting from the advantageous effects of the present invention, the above-mentioned monoalcohol unit, polyalcohol unit, etc.

The polyester resin (B1) is obtained through polycondensation of a dicarboxylic acid component to constitute the dicarboxylic acid unit and a diol component to constitute the diol unit, and for its production, any known direct esterification method or interesterification method is employable.

Examples of the polycondensation catalyst for use in producing the polyester resin (B1) include known antimony compounds such as antimony trioxide, antimony pentoxide, etc., germanium compounds such as germanium oxide, etc. If desired, for increasing the molecular weight thereof, the resin may be produced through solid-phase polymerization according to a conventionally-known method.

In the present invention, preferred examples of the polyester resin (B1) include ethylene-3,9-bisisobutylene-2,4,8,10-tetroxapispiro[5.5]undecane-terephthalate copolymer, ethylene-5-ethyl-2-isobutylene-5-methylene-1,3-dioxane-terephthalate copolymer, ethylene-3,9-bisisobutylene-2,4,8,10-tetroxaspiro[5.5]undecane-isophthalate copolymer, ethylene-5-ethyl-2-isobutylene-5-methylene-1,3-dioxane-isophthalate copolymer, ethylene-3,9-bisisobutylene-2,4,8,10-tetroxaspiro[5.5]undecane-2,6-naphthalene-dicarboxylate copolymer, ethylene-5-ethyl-2-isobutylene-5-methylene-1,3-dioxane-2,6-naphthalene-dicarboxylate copolymer, ethylene-3,9-bisisobutylene-2,4,8,10-tetroxaspiro[5.5]undecane-terephthalate-4,4'-biphenyldicarboxylate copolymer, ethylene-5-ethyl-2-isobutylene-5-methylene-1,3-dioxane-terephthalate-4,4'-biphenyldicarboxylate copolymer, etc.

Among these, from the viewpoint of gas-barrier performance, transparency and availability, ethylene-3,9-bisisobutylene-2,4,8,10-tetroxaspiro[5.5]undecane-terephthalate copolymer is preferred.

(Polyester Resin (B2))

The polyester resin (b2) is a polyester resin having at least one of a diol unit having an alicyclic hydrocarbon structure and a dicarboxylic acid unit having an alicyclic hydrocarbon structure.

The alicyclic hydrocarbon structure in the polyester resin (B2) may be introduced as a diol unit derived from a diol component or as a dicarboxylic acid unit derived from a dicarboxylic acid component, but is preferably introduced as a diol unit derived from a diol component.

The alicyclic hydrocarbon structure may be any of monocyclic or polycyclic (condensed-cyclic, crosslinked-cyclic, spiro cyclic) structure. The ring may have a substituent.

The monocyclic alicyclic hydrocarbon structure includes a cycloalkane structure and a cycloalkene structure, and above all, a cycloalkane structure having 3 to 10 carbon atoms is preferred, a cycloalkane structure having 4 to 8 carbon atoms is more preferred, and a cycloalkane structure having 4 to 6 carbon atoms is even more preferred.

Specific examples of the polycyclic alicyclic hydrocarbon structure include bicyclo[4.4.0]decane (another name: decahydronaphthalene), bicyclo[2.2.1]hept-2-ene (another name: norbornene), tricyclo[3.3.1.1$^{3,7}$]decane (another name: adamantane), tricyclo(5.2.1.0$^{2,6}$)decane (another name: tetrahydrodicyclopentadiene), spiro[5.5]undecane (another name: spirobicyclohexane), etc.

The alicyclic hydrocarbon structure is preferably monocyclic. Above all, a cyclohexane structure is especially preferred.

Specific examples of the diol component capable of constituting the diol unit having an alicyclic hydrocarbon structure that may be contained in the polyester resin (B2) include 1,2-cyclopropanediol, 1,2-cyclobutanediol, 1,3-cyclobutanediol, 2,2,4,4-tetramethyl-1,3-cyclobutanediol, 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, decahydro-1,5-naphthalenediol, decahydro-2,6-naphthalenediol, 1,3-adamantanediol, 1,2-cyclopropanedimethanol, 1,2-cyclobutanedimethanol, 1,3-cyclobutanedimethanol, 2,2,4,4-tetramethyl-1,3-cyclobutanedimethanol, 1,2-cyclopentanedimethanol, 1,3-cyclopentanedimethanol, 3-methyl-1,2-cyclopentanedimethanol, 1,2-cyclohexanedimethanol, 1,3-cyclohexanedimethanol, 1,4-cyclohexanedimethanol, decahydro-1,5-naphthalenedimethanol, decahydro-2,6-naphthalenedimethanol, 5-norbornene-2,3-dimethanol, 1,3-adamantanedimethanol, tricyclo(5.2.1.0$^{2,6}$)decane-4,8-dimethanol, etc., however, the component is not limited to these. In the case where these has optical activity, they may be optical isomers.

Among the above-mentioned diol components, 1,2-cyclopropanediol, 1,2-cyclobutanediol, 1,3-cyclobutanediol, 2,2,4,4-tetramethyl-1,3-cyclobutanediol, 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 1,2-cyclopropanedimethanol, 1,2-cyclobutanedimethanol, 1,3-cyclobutanedimethanol, 2,2,4,4-tetramethyl-1,3-cyclobutanedimethanol, 1,2-cyclopentanedimethanol, 1,3-cyclopentandimethanol, 3-methyl-1,2-cyclopentanedimethanol, 1,2-cyclohexanedimethanol, 1,3-cyclohexanedimethanol and 1,4-cyclohexanedimethanol are preferred, which are compounds having a monocyclic alicyclic hydrocarbon structure.

Specific examples of the dicarboxylic acid component that constitutes the dicarboxylic acid unit having an alicyclic hydrocarbon structure, which may be contained in the polyester resin (B2), include 1,2-cyclopropanedicarboxylic acid, 1,2-cyclobutanedicarboxylic acid, 1,3-cyclobutanedicarboxylic acid, 2,2,4,4-tetramethyl-1,3-cyclobutanedicarboxylic acid, 1,2-cyclopentanedicarboxylic acid, 1,3-cyclopentanedicarboxylic acid, 3-methyl-1,2-cyclopentanedicarboxylic acid, 1,2-cyclohexanedicarboxylic acid, 1,3-cyclohexanedicarboxylic acid, 1,4-cyclohexanedicarboxylic acid, decahydro-1,5-naphthalenedicarboxylic acid, decahydro-2,6-naphthalenedicarboxylic acid, 1,3-adamantanedicarboxylic acid, and their esters; however, the component is not limited to these. When these have optical activity, they may be optical isomers.

Among the above-mentioned dicarboxylic acid components, 1,2-cyclopropanedicarboxylic acid, 1,2-cyclobutanedicarboxylic acid, 1,3-cyclobutanedicarboxylic acid, 2,2,4,4-tetramethyl-1,3-cyclobutanedicarboxylic acid, 1,2-cyclopentanedicarboxylic acid, 1,3-cyclopentanedicarboxylic acid, 3-methyl-1,2-cyclopentanedicarboxylic acid, 1,2-cyclohexanedicarboxylic acid, 1,3-cyclohexanedicarboxylic acid, 1,4-cyclohexanedicarboxylic acid and their esters are preferred, which are compounds having a monocyclic alicyclic hydrocarbon structure.

As the diol component constituting the diol unit having an alicyclic hydrocarbon structure that may be contained in the polyester resin (B2), a compound represented by the following general formula (5) is preferred.

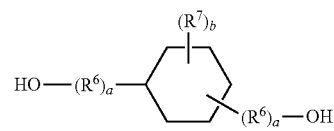

(5)

In the above general formula (5), $R^6$ each independently represents a divalent aliphatic group having 1 to 10 carbon atoms; $R^7$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms; a indicates 0 or 1, and when a=0, the hydroxyl group directly bonds to the cyclohexane ring; and b indicates an integer of 0 to 4, and is preferably 0 from the viewpoint of the transparency of the resin composition of the present invention.

Examples of the divalent aliphatic group represented by $R^6$ include a straight-chain or branched-chain alkylene group or alkenylene group, etc. The carbon number of the divalent aliphatic group is preferably 1 to 10, more preferably 1 to 4. For example, there are mentioned a methylene group, an ethylene group (—CH$_2$CH$_2$—), a propylidene group (CH$_3$CH$_2$CH=), a propylene group, (—CH(CH$_3$)CH$_2$—), a trimethylene group (—CH$_2$CH$_2$CH$_2$—), an isopropylidene group ((CH$_3$)$_2$C=), a tetramethylene group (—CH$_2$CH$_2$CH$_2$CH$_2$—), a butylidene group (CH$_3$CH$_2$CH$_2$CH=), an isobutylidene group ((CH$_3$)$_2$CHCH=), a sec-butylidene group (CH$_3$CH$_2$C(CH$_3$)=), an isobutylene group, (—C(CH$_3$)$_2$—CH$_2$—), etc. Among these, $R^6$ is preferably a methylene group from the viewpoint of the transparency of the resin composition of the present invention.

When $R^7$ is monovalent aliphatic group, examples of the monovalent aliphatic group include a straight-chain or branched-chain alkyl group or alkenyl group, etc. The carbon number of the monovalent aliphatic group is preferably 1 to 10, more preferably 1 to 4. For example, there are mentioned a methyl group, an ethyl group, an n-propyl group, an isopropyl group, an n-butyl group, a sec-butyl group, an isobutyl group, a tert-butyl group, etc.

When $R^7$ is a monovalent alicyclic group, examples of the monovalent alicyclic group include a cycloalkyl group, etc. The carbon number of the monovalent alicyclic group is preferably 3 to 12, more preferably 6 to 9.

When $R^7$ is a monovalent aromatic group, examples of the monovalent aromatic group include an aryl group such as a phenyl group, a biphenyl group, an naphthyl group, etc. The carbon number of the monovalent aromatic group is preferably from 6 to 18, more preferably from 6 to 12.

Among these, $R^7$ is preferably an alkyl group from the viewpoint of the transparency of the resin composition of the present invention. Also from the same viewpoint, more preferably b=0, that is, the cyclohexane ring is not substituted with $R^7$.

The above-mentioned aliphatic group, alicyclic group and aromatic group may be further substituted with a substituent.

Examples of the substituent include a halogen atom such as a chlorine atom, a bromine atom, an iodine atom, etc.; a cyano group, a hydroxyl group, a nitro group, an alkoxy group, an aryloxy group, an acyl group, an amino group, etc.

Specific examples of the compound represented by the general formula (5) include 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol. Above all, 1,3-cyclohexanedimethanol and 1,4-cyclohexanedimethanol are preferred.

In the case where the polyester resin (B2) has a diol unit having an alicyclic hydrocarbon structure, the content of the diol unit having an alicyclic hydrocarbon structure is, from the viewpoint of maintaining the crystallinity of the resin and maintaining the molding workability thereof, preferably 0.5 to 50 mol %, more preferably 3 to 40 mol %, even more preferably 6 to 35 mol %, relative to the total amount of the diol units therein.

The polyester resin (B2) may contain, as other diol units than the diol unit having an alicyclic hydrocarbon structure therein, an aliphatic glycol unit and an aromatic diol unit, and preferably contains an aliphatic glycol unit.

In the case where the polyester resin (B2) contains an aliphatic glycol unit, the content of the aliphatic glycol unit is, from the viewpoint of the crystallinity of the polyester resin and of easiness in drying before use thereof, preferably 50 mol % or more, more preferably 60 mol % or more, even more preferably 70 mol % or more, relative to the total amount of the diol units therein. The upper limit of the content of the aliphatic glycol unit is, in the case where the polyester resin (B2) does not have a diol unit having an alicyclic hydrocarbon structure, preferably 100 mol % or less relative to the total amount of the diol units, but in the case where the polyester resin (B2) has a diol unit having an alicyclic hydrocarbon structure, the upper limit thereof is preferably 99.5 mol % or less relative to the total amount of the diol units.

The carbon number of the aliphatic glycol unit that may be contained in the polyester resin (B2) is preferably 2 to 24, more preferably 2 to 6. Specific examples of the compound capable of constituting the aliphatic glycol unit include ethylene glycol, 1,2-propylene glycol, 1,3-propylene glycol, 1,4-butylene glycol, diethylene glycol, triethylene glycol, 1,2-butylene glycol, 1,3-butylene glycol, 2,3-butylene glycol, 1,5-pentanediol, neopentyl glycol, 1,6-hexanediol. Ethylene glycol, propylene glycol and 1,4-butylene glycol are preferred, and ethylene glycol is more preferred.

The carbon number of the aromatic diol unit that may be contained in the polyester resin (B2) is preferably 6 to 24, more preferably 6 to 20. Specific examples of the compound capable of constituting the aromatic diol unit include hydroquinone, 4,4'-dihydroxybisphenol, 1,4-bis(β-hydroxyethoxy)benzene, 1,4-bis(β-hydroxyethoxyphenyl) sulfone, bis(p-hydroxyphenyl) ether, bis(p-hydroxyphenyl) sulfone, bis(p-hydroxyphenyl)methane, 1,2-bis(p-hydroxyphenyl)ethane, bisphenol A, bisphenol C, 2,5-naphthalenediol, glycols produced by adding ethyleneoxide to these glycols, etc.

The polyester resin (B2) may contain, within a range not detracting from the advantageous effects of the present invention, the above-mentioned monoalcohol unit and polyalcohol unit.

As the dicarboxylic acid component constituting the dicarboxylic acid unit having an alicyclic hydrocarbon structure that may be contained in the polyester resin (B2), a compound represented by the following general formula (6) is preferred.

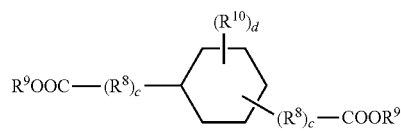

(6)

In the above general formula (6), $R^8$ each independently represents a divalent aliphatic group having 1 to 10 carbon atoms; $R^9$ each independently a hydrogen atom, a methyl group, an ethyl group, or an isopropyl group; $R^{10}$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms; c indicates 0 or 1, and when c=0, the group —COOR$^9$ directly bonds to the cyclohexane ring; and d indicates an integer of 0 to 4, and is preferably 0 from the viewpoint of the transparency of the resin composition of the present invention.

As specific examples of the divalent aliphatic group, the divalent alicyclic group and the divalent aromatic group, those exemplified for the groups of $R^6$ in the general formula (5) are referred to; and as the monovalent aliphatic group, the monovalent alicyclic group and the monovalent aromatic group, those exemplified for the groups of $R^7$ in the general formula (5) are referred to.

Specific examples of the compound represented by the above general formula (6) include 1,2-cyclohexanedicarboxylic acid, 1,3-cyclohexanedicarboxylic acid, 1,4-cyclohexanedicarboxylic acid, and their esters; and among these, 1,3-cyclohexanedicarboxylic acid, 1,4-cyclohexanedicarboxylic acid and their esters are preferred.

In the case where the polyester resin (B2) has a dicarboxylic acid unit having an alicyclic hydrocarbon structure, the content of the dicarboxylic acid unit having an alicyclic hydrocarbon structure is, from the viewpoint of maintaining the crystallinity of the resin and maintaining the molding workability thereof, preferably 0.5 to 50 mol %, more preferably 3 to 40 mol %, even more preferably 6 to 35 mol %, relative to the total amount of the dicarboxylic acid units therein.

The polyester resin (B2) for use in the present invention may contain, as any other dicarboxylic acid units than the dicarboxylic acid unit having an alicyclic hydrocarbon structure, an aromatic dicarboxylic acid unit and a linear or branched aliphatic dicarboxylic acid unit, and preferably contains an aromatic dicarboxylic acid unit.

In the case where the polyester resin (B2) contains an aromatic dicarboxylic acid unit, the content of the aromatic dicarboxylic acid unit is preferably 50 mol % or more, more preferably 60 mol % or more, even more preferably 70 mol % or more, relative to the total amount of the dicarboxylic acid units therein. The upper limit of the content of the aromatic dicarboxylic acid unit is, in the case where the polyester resin (B2) does not contain the dicarboxylic acid unit having an alicyclic hydrocarbon structure, preferably 100 mol % or less relative to the total amount of the dicarboxylic acid units in the resin, but in the case where the polyester resin (B2) contains the dicarboxylic acid unit having an alicyclic hydrocarbon structure, the content is preferably 99.5 mol % or less relative to the total amount of the dicarboxylic acid units.

The compound capable of constituting the aromatic dicarboxylic acid unit that may be contained in the polyester resin (B2) includes a dicarboxylic acid having an aromatic nuclei such as benzene, naphthalene, diphenyl, oxydiphenyl, sulfonyldiphenyl, methylenediphenyl or the like, and derivatives thereof. Examples of the aromatic dicarboxylic acid derivative include esters formed of an aromatic dicarboxylic acid and an alcohol having 1 to 3 carbon atoms.

Among these, terephthalic acid, isophthalic acid, naphthalenedicarboxylic acids such as 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, etc., and 4,4'-biphenyldicarboxylic acid, 3,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, anthracenedicarboxylic acid and the like, and $C_{1-3}$ short-chain alkyl esters of these acids are preferred; terephthalic acid, isophthalic acid, 2,6-naphthalenedicarboxylic acid, 4,4'-biphenyldicarboxylic acid and their methyl esters and ethyl ethers are more preferred; terephthalic acid, isophthalic acid and their methyl esters are even more preferred; and terephthalic acid is most preferred.

Specific examples of the compound capable of constituting the linear or branched aliphatic dicarboxylic acid unit that may be contained in the polyester resin (B2) include succinic acid, glutaric acid, adipic acid, pimelic acid, suberic acid, azelaic acid, sebacic acid, dodecanedicarboxylic acid, etc.

The polyester resin (B2) may contain, within a range not detracting from the advantageous effects of the present invention, a monocarboxylic acid units, a tri or more polycarboxylic acid units, a carboxylic acid anhydride unit, etc.

The polyester resin (B2) is obtained through polycondensation of a dicarboxylic acid component to constitute a dicarboxylic acid unit and a diol component to constitute a diol unit, and for its production, any known direct esterification method or interesterification method is employable.

Examples of the polycondensation catalyst for use in producing the polyester resin (B2) include known antimony compounds such as antimony trioxide, antimony pentoxide, etc., germanium compounds such as germanium oxide, etc. If desired, for increasing the molecular weight thereof, the resin may be produced through solid-phase polymerization according to a conventionally-known method.

Preferred examples of the polyester resin (B2) for use in the present invention include ethylene-1,4-cyclohexanedimethylene-terephthalate copolymer, ethylene-1,3-cyclohexanedimethylene-terephthalate copolymer, ethylene-1,4-cyclohexanedimethylene-isophthalate copolymer, ethylene-1,3-cyclohexanedimethylene-isophthalate copolymer, ethylene-1,4-cyclohexanedimethylene-2,6-naphthalenedicarboxylate copolymer, ethylene-1,4-cylohexanedimethylene-terephthalate-4,4'-biphenyldicarboxylate copolymer, etc. Among these, from the viewpoint of the gas-barrier performance, the transparency and the availability thereof, ethylene-1,4-cyclohexanedimethylene-isophthalate copolymer is preferred.

Preferably, the polyester resin (B) for use in the present invention is dried before use to have a water content therein of preferably 200 ppm or less, more preferably 100 ppm or less, more preferably 50 ppm or less.

The intrinsic viscosity (value measured in a mixed solvent of phenol/1,1,2,2-tetrachloroethane=60/40 by mass, at 25° C.) of the polyester resin (B) for use in the present invention is preferably 0.3 to 2.0 dl/g, more preferably 0.4 to 1.8 dl/g.

When the limiting viscosity falls within the above range, the molecular weight of the polyester is sufficiently high and the viscosity thereof in melt is not too high, and therefore realizing a resin composition having good molding workability. In addition, the mechanical properties of the molded article using the resin composition are also good.

The content of the polyester resin (B) in the resin composition of the present invention is preferably 0.5 to 15.0% by mass, more preferably 1.0 to 13.0% by mass, even more preferably 1.5 to 11.0% by mass, still more preferably 2.5 to 10.0% by mass, further more preferably 3.0 to 8.0% by mass.

When the content is less than 0.5% by mass, the transparency in the portion having a draw ratio of 5 times or more in the molded article using the resultant resin composition could not improve. On the other hand, when the content is more than 15% by mass, the transparency in the portion having a draw ratio of less than 5 times in the molded article using the resultant resin composition is poor and, in addition, the resin composition could not enjoy the effect of improving the gas-barrier performance thereof to be realized by incorporation of the polyamide resin (C) thereinto, and the gas-barrier performance of the molded article using the composition is poor.

<Polyamide Resin (C)>

As the polyamide resin (C) for use in the present invention, any known polyamide resin is usable, including those prepared through polycondensation of an ω-aminocarboxylic acid, a lactam or a diamine and a dicarboxylic acid as monomers.

Specific examples of ω-aminocarboxylic acid monomers include 6-aminocaproic acid, 11-aminoundecanoic acid, 12-aminodecanoic acid, etc.; and examples of lactam monomers include ε-caprolactam, ω-laurolactam, etc. Examples of other aromatic aminocarboxylic acids include paraaminomethylbenzoic acid.

Examples of diamine monomers include aliphatic diamines such as tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, etc.; diamines having an aromatic ring such as metaxylylenediamine, paraxylylenediamine, etc.; diamines having an alicyclic structure such as 1,3-bis(aminomethyl)cyclohexane, 1,4-bis(aminomethyl)cyclohexane, 1-amino-3-aminomethylhexane, 5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, etc.; however, the diamine monomers are not limited to these.

Examples of dicarboxylic acid monomers include aliphatic dicarboxylic acids such as succinic acid, glutaric acid, adipic acid, pimelic acid, suberic acid, azelaic acid, sebacic acid, dodecanedicarboxylic acid, etc.; dicarboxylic acids having an alicyclic structure such as cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)-2,4,8,10-tetroxaspiro[5.5]undecane, etc.; dicarboxylic acids having an aromatic ring such as terephthalic acid, isophthalic acid, phthalic acid, 2-methylterephthalic acid, naphthalenedicarboxylic acid, biphenyldicarboxylic acid, tetralindicarboxylic acid, etc.; and their short-chain alkyl esters; however, the dicarboxylic acid monomers are not limited to these. Specifically, the short-chain alkyl esters include those having 1 to 3 carbon atoms, that is, methyl esters, ethyl esters, propyl esters and isopropyl esters; and above all, methyl esters are preferred.

Within a range not detracting from the advantageous effects of the present invention, tri or more polycarboxylic acids such as trimellitic acid, trimesic acid, pyromellitic acid, tricarballylic acid and the like may also be used.

Further, within a range not detracting from the advantageous effects of the present invention, monocarboxylic acids such as benzoic acid, propionic acid, butyric acid and the like may also be used.

Among the above-mentioned polyamide resins, a polyamide resin (C1) that has a diamine unit containing a metaxylylenediamine unit in an amount of 70 mol % or more and a dicarboxylic acid unit containing an α,ω-aliphatic dicarboxylic acid unit in an amount of 70 mol % or more is preferred, from the viewpoint of realizing an effect of improving gas-barrier performance.

The diamine unit in the polyamide resin (C1) contains a metaxylylenediamine unit preferably in an amount of 70 mol % or more, more preferably 80 mol % or more, even more preferably 90 to 100 mol %. Containing the metaxylylenediamine unit in an amount of 70 mol % or more of the diamine unit, the gas-barrier performance of the resultant polyamide can be efficiently improved.

Examples of other compounds capable of constituting any other diamine units than the metaxylylenediamine unit include a diamine having an aromatic ring such as paraxylylenediamine, etc.: a diamine having an alicyclic structure such as 1,3-bis(aminomethyl)cyclohexane, 1,4-bis(aminomethyl)cyclohexane, etc.; an aliphatic diamine such as tetramethylenediamine, hexamethylenediamine, nonamethylenediamine, 2-methyl-1,5-pentanediamine, etc.; however, the compound is not limited to these.

Within a range not detracting from the advantageous effects of the present invention, tri or more polyamines such as bis(hexamethylene)triamine and the like may also be used.

Further, also within a range not detracting from the advantageous effects of the present invention, monoamines such as butylamine, hexylamine, octylamine and the like may also be used.

The dicarboxylic acid unit in the polyamide resin (C1) contains an α,ω-aliphatic dicarboxylic acid unit preferably in an amount of 70 mol % or more, more preferably 75 mol % or more, even more preferably 80 to 100 mol %. Containing the α,ω-aliphatic dicarboxylic acid unit in an amount of 70 mol % or more, the gas-barrier performance of the resin can be prevented from being lowered and the crystallinity thereof can also be prevented from being lowered too much.

Examples of the α,ω-aliphatic dicarboxylic acid that may be the starting material include suberic acid, adipic acid, azelaic acid, sebacic acid, etc. Adipic acid and sebacic acid are preferred, and adipic acid is more preferred.

Examples of the other dicarboxylic acid units than the α,ω-aliphatic dicarboxylic acid unit include structural units derived from alicyclic dicarboxylic acids such as 1,3-cyclohexanedicarboxylic acid, 1,4-cyclohexanedicarboxylic acid, etc.; structural units derived from aromatic dicarboxylic acids such as terephthalic acid, isophthalic acid, orthophthalic acid, xylylenedicarboxylic acid, naphthalenedicarboxylic acid, etc.; however, the units are not limited to these.

As the units constituting the polyamide resin (C1), structural units derived from lactams such as ε-caprolactam, laurolactam, etc., and aliphatic aminocarboxylic acids such as aminocaproic acid, aminoundecanoic acid, etc., and structural units derived from aromatic aminocarboxylic acids such as para-aminomethylbenzoic acid, etc. may also be used as copolymerization units, in addition to the above-mentioned diamine unit and dicarboxylic acid unit, within a range not detracting from the advantageous effects of the present invention.

Specific examples of the polyamide resin (C) include polymetaxylyleneadipamide (polyamide MXD6), polyparaxylyleneadipamide, polycaproamide (nylon 6), polyhexamethyleneadipamide (nylon 66), polyhexamethylenesebacamide (nylon 610), polyundecamethyleneadipamide (nylon 116), polyhexamethylenedodecanamide (nylon 612), polyundecanamide (nylon 11), polydodecanamide (nylon 12) and their copolymerization amides, etc. One alone or two or more of these polyamides may be used either singly or as combined.

Polyamide resin (C) is produced through melt polycondensation (melt polymerization).

In one mode of melt polycondensation, a nylon salt formed of a diamine and a dicarboxylic acid is heated in the presence of water under pressurized conditions, and the nylon salt is polymerized in a molten state while added water and condensation water are removed.

In an alternative mode of melt polycondensation, a diamine is added directly to a dicarboxylic acid melt, and the mixture is poly-condensed. In this case, in order to maintain the reaction system in a homogeneous liquid state, it is desirable that the diamine is continuously added to the dicarboxylic acid during polycondensation, while the reaction system is heated so that the reaction temperature does not lower the melting points of the formed oligoamides and polyamide.

To the polyamide resin (C) polycondensation system, a phosphorus atom-containing compound may be added for promoting amidation and preventing coloring during polycondensation.

Examples of the phosphorus atom-containing compound include dimethylphosphinic acid, hypophosphorous acid, sodium hypophosphite, potassium hypophosphite, lithium hypophosphite, ethyl hypophosphite, phenylphosphonous acid, sodium phenylphosphonite, ethyl phenylphosphonite, phenylphosphonic acid, ethylphosphonic acid, sodium phenylphosphonate, diethyl phenylphosphonate, sodium ethylphosphonate, potassium ethylphosphonate, phosphorous acid, sodium hydrogenphosphite, sodium phosphite, triethyl phosphite, triphenyl phosphite, pyrophosphorous acid, etc. However, the phosphorus atom-containing compound is not limited to these compounds.

Of these, metal hypophosphites such as sodium hypophosphite, potassium hypophosphite, lithium hypophosphite and the like are preferably used, since these salts can effectively promote amidation and prevent coloring.

The amount of the phosphorus atom-containing compound added to the polyamide resin (C) polycondensation system is preferably 1 to 500 ppm, as reduced to the phosphorus atom concentration of the polyamide resin (C), more preferably 5 to 450 ppm, further preferably 10 to 400 ppm. Through controlling the amount of the phosphorus atom-containing compound to meet the above conditions, coloring of polyamide during polycondensation and gelation of polyamide can be prevented. Thus, the appearance of the molded articles using the resin can be maintained in a favorable state.

In addition to the phosphorus atom-containing compound, an alkali metal compound is preferably added to the polyamide resin (C) polycondensation system. In order to prevent coloring of polyamide during polycondensation, the phosphorus atom-containing compound must be used in a sufficient amount. However, the phosphorus atom-containing compound may promote gelation of polyamide in some cases. Therefore, an alkali metal compound or an alkaline earth metal compound is preferably caused to be co-present with the phosphorus atom-containing compound so as to control rate of amidation. Examples of the compound include alkali metal/alkaline earth metal hydroxides such as lithium hydroxide, sodium hydroxide, potassium hydroxide, magnesium hydroxide, calcium hydroxide, and barium hydroxide; and alkali metal/alkaline earth metal acetates such as lithium acetate, sodium acetate, potassium acetate, magnesium acetate, calcium acetate, and barium acetate. However, the compound is not limited these specific examples.

In the case where the alkali metal compound is added to the polyamide resin (C) polycondensation system, the ratio by mole of the compound to the phosphorus atom-containing compound is preferably adjusted to 0.5 to 2.0, more preferably 0.6 to 1.8, further preferably 0.7 to 1.5. Through controlling the ratio to meet the above conditions, gel formation can be suppressed, while amidation is promoted by the phosphorus atom-containing compound.

Polyamide resin (C) obtained through melt polycondensation is removed from the reactor, and then pelletized and dried before use. Alternatively, solid-phase polymerization may be carried out in order to elevate the polymerization degree.

No particular limitation is imposed on the heating apparatus for carrying out drying and solid-phase polymerization, and any known apparatus may be employed by a known method. Examples of the heating apparatus which may be suitably employed in the invention include a continuous mode heating drier; a rotary drum heating apparatus called a tumble drier, a conical drier, a rotary drier, etc.; and a conical heating apparatus having agitation blades therein, called Nauta mixer.

Particularly when solid-phase polymerization of polyamide is carried out, among the aforementioned apparatuses, a rotary drum heating apparatus is preferably employed, since the rotary drum heating apparatus realizes complete closure of the system, to thereby carry out polycondensation in a state where oxygen, a coloring causal substance, is removed.

The polyamide resin (C) produced through the aforementioned steps is less colored and undergoes less gelation. In the present invention, the polyamide resin produced through the aforementioned steps preferably has a color difference test b* value of JIS-K-7105 of 5 or less, more preferably 3 or less, further preferably 1 or less. When the polyamide has a b* value of 5 or less, a molded article obtained through processing the resin exhibits excellent whiteness, which ensures the value of the product.

Among indices of the polymerization degree of the polyamide resin (C), relative viscosity is generally employed.

Preferably, the polyamide resin (C) has a relative viscosity of 1.50 to 4.20, more preferably 1.60 to 3.60, further preferably 1.70 to 2.80.

Through controlling the relative viscosity of the polyamide resin (C) to meet the above conditions, consistent moldability can be attained, to thereby produce molded articles of favorable appearance.

In the present invention, the relative viscosity of the polyamide resin (C) means the value measured according to the method described in the section of Examples.

The content of the polyamide resin (C) relative to the total amount of the resin composition of the present invention is preferably 0.5 to 10.0% by mass, more preferably 1.0 to 8.0% by mass, even more preferably 2.0 to 6.0% by mass.

When the content is 0.5% by mass or more, the molded article using the resin composition of the present invention can have improved gas-barrier performance. On the other hand, when the content is 10.0% by mass or less, the influence of the resin on the transparency of the molded article using the resin composition of the present invention can be suppressed, and the molded article can therefore have good transparency.

[Other Resin Components than Resins (A) to (C)]

The resin composition of the present invention may contain any other resin components than the resins (A) to (C) within a range not detracting from the advantageous effects of the present invention.

Examples of such other resins include polyolefins and modified resins thereof, elastomers having styrene inside the skeleton thereof, etc.

<Additives>

Within a range not detracting from the advantageous effects of the present invention, the resin composition may contain additives such as an anti-oxidant, a delustering agent, a heat stabilizer, a weather stabilizer, a UV-absorber, a nucleating agent, a plasticizer, a fire retardant, an antistatic agent, an anti-coloring agent, a lubricant, a gelation inhibitor, an oxidation accelerator and the like, and clay such as layered silicate or the like, nanofiller, etc.

(Oxidation Accelerator)

Adding an oxidation accelerator to the resin composition of the present invention may further enhance the gas-barrier performance of the molded article using the resin composition.

The oxidation accelerator may be any one capable of exhibiting the above-mentioned effect, but from the viewpoint of accelerating the oxidation of the polyamide resin (C), those containing a transition metal element are preferred. The transition metal element is preferably at least one selected from Group-VIII transition metals in the periodic table of elements, manganese, copper and zinc, and is, from the viewpoint of expressing oxygen absorbability, more preferably at least one selected from cobalt, iron, manganese and nickel, even more preferably cobalt.

As the oxidation accelerator of the type, the above-mentioned metal elemental substances may also be used in the form of low-valence oxides, inorganic acid salts, organic acid salts or complex salts thereof, in addition to the elemental substances. The inorganic acid salts include halides such as chlorides, bromides, etc.; carbonates, sulfates, nitrates, phosphates, silicates, etc. On the other hand, the organic acid salts include carboxylates, sulfonates, phosphonates, etc. In addition, transition metal complexes with β-diketones, β-ketoacid esters or the like are also usable.

In particular, in the present invention, at least one selected from carboxylates, carbonates, acetylacetonate complexes, oxides and halides containing the above-mentioned metal atom is preferably used, as capable of favorably expressing oxygen absorbability, at least one selected from octanoates, neodecanoates, naphthenates, stearates, acetates, carbonates and acetylacetonate complexes is more preferably used, and use of a cobalt carboxylate such as cobalt octanoate, cobalt naphthenate, cobalt acetate, cobalt stearate or the like is even more preferred.

One alone or two or more of the above-mentioned oxidation accelerators may be used either singly or as combined.

In the case where the oxidation accelerator is one containing a transition metal element, the content thereof is, from the viewpoint of accelerating oxidation of the polyamide resin (C) to enhance the oxygen absorbability of molded articles, preferably 10 to 1,000 ppm as the transition metal concentration in wrapping/packaging materials, more preferably 20 to 500 ppm, even more preferably 40 to 300 ppm.

The transition metal concentration in molded articles may be measured according to a known method, for example, according to ICP emission Spectrochemical analysis, ICP mass spectrometry, fluorescent X-ray analysis, etc.

The above-mentioned oxidation accelerator functions not only as a catalyst for accelerating oxidation of the polyamide resin (C) but also as a catalyst for oxidation of unsaturated carbon bond-having organic compounds and compounds having a secondary or tertiary hydrogen atom in the molecule. Consequently, in the resin composition of the present invention, various compounds such as polymers of unsaturated hydrocarbons such as polybutadiene or polyisoprene or oligomers thereof, compounds having a xylylenediamine skeleton, and compounds added with a functional group for enhancing the miscibility of those compounds with polyesters may be incorporated, in addition to the above-mentioned oxidation accelerator, for further enhancing oxygen absorbability.

[Method for Producing Resin Composition]

The method for producing the resin composition is not specifically limited. For example, the polyester resin (A), the polyester resin (B) and the polyamide resin (C) may be melt-kneaded in an extruder to produce the composition. In doing so, the three may be mixed and melt-kneaded all at a time, or for the purpose of enhancing the kneading dispersibility of the resin component having a small content ratio, a master batch may be previously prepared and again the three are mixed and melt-kneaded to produce the resin composition of the present invention.

[Molded Article]

The resin composition of the present invention may find a variety of uses for which gas-barrier performance is required, such as wrapping/packaging materials and industrial materials. The resin composition may be molded to give molded articles such as films, sheets and containers of bottles, cups, etc.

The molded article of the present invention has at least one layer formed of the resin composition. The molded article of the present invention may have a single-layer structure of the resin composition, or a laminate structure including at least one layer formed of the resin composition and, on at least one surface thereof, another thermoplastic resin layer (e.g., a polyester resin layer or an adhesive resin layer). The laminate structure may be composed of two or more layers formed of the resin composition.

At least a part of the molded article of the present invention may be stretched at a draw ratio of 5 to 20 times to give a secondary molded article. The secondary molded article secures excellent transparency and gas-barrier performance even in the stretched part thereof, and is therefore favorable for use that requires gas-barrier performance and transparency.

The method for producing the molded article of the present invention is not specifically limited, and any known method is employable. For example, films or sheets of the resin composition may be produced by extruding the melt of the composition by means of an extruder through a T die, a circular die, or the like. The thus-produced film may be stretched to provide a stretched film. A bottle-shaped packaging container may be produced by injecting the melt of the resin composition from an injection molding machine to a die, to thereby provide a preform, and blow-stretching the preform at a stretching temperature. In this case, the mouth and therearound of the bottle is not stretched too much and therefore has a draw ratio of less than 5 times, while the bottle body part is stretched in a draw ratio of 5 times or more. In any case, the bottle formed of the resin composition of the present invention can have excellent transparency and excellent gas-barrier performance in any portion thereof.

Containers such as trays and cups may be produced by injecting the melt of the resin composition from an injection molding machine to a die, or through a molding technique such as vacuum forming or air pressure forming. The method for producing a molded product from the resin composition of the present invention is not limited to the aforementioned techniques, and various other methods may be applied.

The molded article of the present invention has excellent transparency in any portion stretched at a high draw ratio or a low draw ratio.

The haze of the molded article of the present invention in the unstretched portion (where the draw ratio is 1) or in the portion stretched at a draw ratio of less than 5 times is preferably 5.0% or less, more preferably 4.2% or less, even more preferably 4.0% or less, still more preferably 3.7% or less, further more preferably 3.3% or less.

The haze of the molded article of the present invention in the portion stretched at a draw ratio of 5 to 20 times is preferably 4.2% or less, more preferably 4.0% or less, even more preferably 3.7% or less.

The haze value of the molded article is one measured according to the method described in the section of Examples.

Regarding the size of the disperse particles of the polyamide resin (C) in the portion of the molded article of the present invention stretched at a draw ratio of 5 to 20 times, it is desirable that the major diameter thereof is 1.0 to 8.0 μm and the minor diameter thereof is 0.01 to 0.50 μm. The major diameter and the minor diameter are measured according to the method described in the section of Examples.

In the portion stretched at a draw ratio of 5 to 20 times, when the disperse particles of the polyamide resin (C) are dispersed to have the size falling within the range, both the transparency and the gas-barrier performance can be realized in a more preferred state.

The molded article of the present invention has good gas-barrier performance.

The oxygen transmission coefficient of the molded article of the present invention is, when the resin composition of the present invention does not contain an oxidation accelerator, preferably 1.50 [cc·mm/(m$^2$·day·0.21 atm)] or less, more preferably 1.40 [cc·mm/(m$^2$·day·0.21 atm)] or less, even more preferably 1.30 [cc·mm/(m$^2$·day·0.21 atm)] or less.

The oxygen transmission coefficient of the molded article of the present invention is, when the resin composition of the present invention contains an oxidation accelerator, preferably 0.10 [cc·mm/(m$^2$·day·0.21 atm)] or less, more preferably 0.06 [cc·mm/(m$^2$·day·0.21 atm)] or less, even more preferably 0.05 [cc·mm/(m$^2$·day·0.21 atm)] or less, still more preferably 0.03 [cc·mm/(m$^2$·day·0.21 atm)] or less.

The carbon dioxide transmission coefficient of the molded article of the present invention is preferably 30.0 [cc·mm/(m$^2$·day)] or less, more preferably 27.0 [cc·mm/(m$^2$·day)] or less, even more preferably 25.0 [cc·mm/(m$^2$·day)].

The oxygen transmission coefficient and the carbon dioxide transmission coefficient of the molded article are values measured according to the description in the section of Examples.

Packaging containers using the resin composition of the present invention can be applied to keeping or storage of various goods. Examples of such goods include beverages, seasonings, food grains, liquid and solid processed foods requiring aseptic packaging or heat sterilization, chemicals, liquid commodities, pharmaceuticals, semiconductor integrated circuits, electronic devices, etc.

EXAMPLES

The present invention will next be described in more detail by way of examples, which should not be construed as limiting the invention thereto. Materials, analysis and measurement methods, and molded article production methods employed in the Examples and Comparative Examples are described below.

1. Materials

The following materials were employed as pellets in Examples and Comparative Examples.

<Polyester Resins>

The following polyester resins were used. In use, pellets of each material dried at 150° C. for 6 hours, using a dehumidifying drier, to have a water content of 30 ppm were used.

PET (A-1): Manufactured by INVISTA Corporation, trade name "Polyshield 2400", intrinsic viscosity=0.80 dl/g, copolymerized PET resin containing 0.1 mol % of sodium sulfoisophthalate unit and 3.3 mol % of isophthalic acid unit relative to 100 mol % of the dicarboxylic acid unit therein (resin corresponding to the polyester resin (A) in the present invention).

PET (A-2): Manufactured by INVISTA Company, trade name "Polyshield 2300K", intrinsic viscosity=0.80 dl/g, copolymerized PET resin containing 0.1 mol % of sodium sulfoisophthalate unit and 3.3 mol % of isophthalic acid unit relative to 100 mol % of the dicarboxylic acid units therein and containing 80 ppm of cobalt metal (resin corresponding to the polyester resin (A) in the present invention).

PET (R): Manufactured by Japan Unipet Company, trade name "UNIPET BK-2180", intrinsic viscosity=0.83 dl/g, copolymerized PET resin containing 1.5 mol % of isophthalic acid unit relative to 100 mol % of the dicarboxylic acid units therein (used in Comparative Examples).

PET (B-1): Manufactured by Mitsubishi Gas Chemical Co., Ltd., trade name "ALTESTER", intrinsic viscosity=0.71 dl/g, copolymerized PET resin containing 20 mol % of spiroglycol unit relative to 100 mol % of the diol units therein (resin corresponding to the polyester resin (B), especially to the polyester resin (B1) in the first embodiment of the present invention).

PET (B-2): Manufactured by Eastman Chemical Company, trade name "Eastar Copolyester 6763", intrinsic viscosity=0.75 dl/g, copolymerized PET resin containing 33 mol % of 1,4-cyclohexanedimethanol unit relative to 100 mol % of the diol units therein (resin corresponding to the polyester resin (B), especially to the polyester resin (B2) in the second embodiment of the present invention).

<Polyamide Resin>

PA1: Manufactured by Mitsubishi Gas Chemical Co., Ltd., trade name "MX Nylon", polymetaxylyleneadipamide, relative viscosity=2.1, b* value: −3 (resin corresponding to the polyamide resin (C) in the present invention).

2. Analytical Method and Measurement Method

The physical properties of the materials and the polyester containers used in Examples and Comparative Examples were analyzed and measured according to the following methods.

(1) Intrinsic Viscosity of Polyester Resin

According to JIS K7367-1, polyester resin was dissolved in a mixed solvent of phenol/1,1,2,2-tetrachloroethane=60/40 (ratio by mass), kept at 25° C., and measured using a Cannon-Fenske viscometer.

(2) Relative Viscosity of Polyamide Resin 0.2 g of polyamide resin was weighed accurately, and dissolved in 20 ml of 96 mass % sulfuric acid with stirring at 20 to 30° C. After completely dissolved, 5 ml of the solution was immediately taken in a Cannon-Fenske viscometer, left in a constant-temperature bath at 25° C. for 10 minutes, and then the dropping time (t) of the solution was measured. The dropping time ($t_0$) of 96 mass % sulfuric acid was measured similarly. Using the measured values of t and $t_0$, the relative viscosity of the polyamide resin was calculated according to the following equation.

Relative Viscosity=$t/t_0$ (3) Thickness of Bottle Body

The thickness of the body of the bottle produced in Examples and Comparative Examples was measured as follows.

The thickness of the part at a position of 70 mm from the bottle bottom was measured using a magnetic thickness meter (manufactured by Olympus Corporation, trade name: "MAGNAMIKE 8500" in 4 directions (0°, 90°, 180°, 270°), and the mean value of the found data was referred to as the thickness of the bottle body.

(4) Haze of Molded Article (Bottle)

The haze of the bottle produced in Examples and Comparative Examples was measured, at a portion thereof where the draw ratio was less than 5 times and at a portion where the draw ratio was 5 times or more, according to JIS K7105.

As the portion where the draw ratio was less than 5 times, a test piece prepared by longitudinally dividing the mouth of the bottle into two (draw ratio: 1 time, that is, unstretched part) was used; and as the portion where the draw ratio was 5 times or more, a test piece prepared by cutting the bottle body into a size of 5 cm×5 cm (draw ratio: 12.3 times) was used. Using a color/turbidity meter (manufactured by Nippon Denshoku Industries Co., Ltd., trade name "COH-400"), these samples were analyzed to measure the haze thereof.

(5) Disperse Particle Size of Polyamide Resin in Molded Article (Bottle)

The average major diameter L (μm) and the average minor diameter W (μm) of the disperse particles of the polyamide resin in the bottle produced in Examples and Comparative Examples were measured as follows.

The mouth (portion where the areal draw ratio was less than 5 times) and the body (portion where the areal draw ratio was 5 times or more) of the bottle produced in Examples and Comparative Examples were cut out, and the piece was buried in an epoxy resin in such a manner that the cross section thereof could be in the thickness direction and the MD direction of the bottle.

Next, using an ultra-microtome (manufactured by Boeckeler Instruments Corporation, trade name "CR-X Power Tome XL"), a ultrathin piece for observation having a thickness of 0.1 μm was cut out of the buried sample. The thus-prepared ultrathin piece was stained with ruthenium chloride, and observed on a copper mesh with an electronic microscope. Based on the density difference between the stained polyamide resin and polyester resin, the dispersion condition of the sample was observed.

Among the individual disperse particles of the polyamide resin existing in a size of 5 μm in length and 5 μm in width (area 25 μm²) of each sample of the bottle mouth and the bottle body, two parallel tangent lines were drawn at both sides of the longest part, and the distance between the tangent lines was referred to as the major diameter L. Next, a line crossing each particle in parallel to the two tangent lines was drawn, and the length of the longest line overlapping with the particle was measured, and the length was referred to as the minor diameter W. In that manner, 300 disperse particles of the polyamide resin were analyzed to measure the major diameter L and the minor diameter W of each particle of the polyamide resin. The number average values of the major diameter and the minor diameter thus measured are shown in Tables 1 to 3.

<Observation Condition>
Electronic microscope: scanning electronic microscope, manufactured by Hitachi High-Technologies Corporation, trade name "S4800"
Accelerating voltage: 30 kV
Current: 10 mA
Measurement magnification: 25,000 times
Measurement mode: TEM (6) Measurement of Oxygen Transmission Rate An oxygen transmission rate measuring device (manufactured by MOCON Inc., trade name "OX-TRAN 2/61") was used.

100 mL of water was put into a 500-mL bottle produced in Examples 1 to 12 and Comparative Examples 1 to 21, and under the condition at an oxygen partial pressure of 0.21 atm, 1-atm nitrogen was circulated inside the bottle at a flow rate of 20 mL/min, under the condition of a bottle inside humidity of 100% RH (relative humidity), an outside humidity of 50% RH and a temperature of 23° C., and after 200 hours, the oxygen amount in the nitrogen having been circulated inside the bottle was detected with a coulometric sensor to determine the oxygen transmission rate. The measured value of the oxygen transmission rate was converted into the oxygen transmission coefficient according to the following equation.

Oxygen transmission coefficient [cc·mm/(m²·day·0.21 atm)]=oxygen transmission rate [cc/(day·0.21 atm)]×bottle mean thickness [mm]/surface area [m²]/0.21 [atm]

(surface area=0.04 m²)

Regarding the bottles produced in Examples 13 to 18 and Comparative Examples 22 to 25, the oxygen transmission rate thereof was measured in the same manner as above except that the period of 200 hours was changed to 90 days, and the oxygen transmission coefficient after 90 days was calculated.

(7) Measurement of Carbon Dioxide Transmission Rate

A carbon dioxide measuring device (manufactured by MOCON Inc., trade name "PERMATRAN-C MODEL 10") was used.

After bottle production, 500 ml of water and 3.95 g of dry ice were put into each bottle in such a controlled manner that the carbon dioxide dissolution amount in water inside the bottle could be 4.0 gas volume, the bottle was capped and left in an environment at 23° C. and 50% RH (relative humidity) for 24 hours.

Subsequently, the carbon dioxide transmission rate of the bottle [cc/day] was measured, and converted into the carbon dioxide transmission coefficient according to the following equation.

Carbon dioxide transmission coefficient [cc·mm/(m²·day)]=carbon dioxide transmission rate [cc/day]×bottle mean thickness [mm]/surface area [m²]

(surface area=0.04 m²)

Examples 1 to 18, Comparative Examples 1 to 25

Resins of the kind and the amount shown in Tables 1 to 3 were mixed at room temperature (25° C.) for 10 minutes, and extruded using a twin-screw extruder (manufactured by Toshiba Machine Co., Ltd., Model "TEM37-BS") under the condition at a temperature of 280° C. and an extrusion rate of 15 kg/h while the cylinder was depressurized with a vacuum pump, and the extruded strands were pelletized, and dried in vacuum under the condition of 150° C. for 6 hours to give pellets of the resin composition of the present invention.

Next, using an injection-molding machine (Injection-Molding Machine Model "KS-100TI" manufactured by Kata Systems Co., Ltd., eight-shot molding), the above-mentioned pellets were injection-molded into a single-layer preform (total length: 95 mm, outer diameter: 22 mm, thickness: 2.8 mm).

(Single-Layer Preform Molding Condition)
Injection cylinder temperature: 280° C.
Resin channel temperature in mold: 280° C.
Mold cooling water temperature: 15° C.

Further, after cooled, the formed single-layer preform was blow-molded in a mode of biaxially stretching, using a blow-molding machine (manufactured by Frontier, Inc., Model "EFB1000ET"), thereby giving a single-layer bottle (height: 223 mm, body diameter: 65 mm, volume: 500 mL, wall thickness: 250 µm, mass: 20.5 g).

(Biaxially-Stretching Blow-Molding Condition)
Preform heating temperature: 103° C.
Pressure to stretching rod: 0.5 MPa
Primary blow pressure: 0.5 MPa
Secondary blow pressure: 2.5 MPa
Primary blow delay time: 0.32 sec
Primary blow time: 0.28 sec
Secondary blow time: 2.0 sec
Blow exhaust time: 0.6 sec
Mold temperature: 30° C.

The single-layer bottles produced in the manner as above were measured to determine the properties thereof according to the above-mentioned methods. The results are shown in Tables 1 to 3.

TABLE 1

| | Ingredients of Resin Composition | | | | Test Results | | | | | | | |
| | Polyester Resins | | Polyamide | | Transparency | | Domain Size of Polyamide Resin (C) | | | | Gas-Barrier Performance | |
| | | | | Resin | | | Areal Draw Ratio | | | | | |
| | | Resin (A) | Resin (B) | Resin (C) | Haze Areal Draw Ratio | | portion at less than 5 times | | portion at 5 times or more | | Oxygen Trans- | Carbon Dioxide |
| | PET (R) (mass %) | PET (A-1) (mass %) | PET (B-1) (mass %) | PA1 (mass %) | portion at less than 5 times (%) | portion at 5 times or more (%) | major diameter (µm) | minor diameter (µm) | major diameter (µm) | minor diameter (µm) | mission Coefficient (*1) | Transmission Coefficient (*2) |
|---|---|---|---|---|---|---|---|---|---|---|---|---|
| Example 1 | — | 92.5 | 2.5 | 5.0 | 2.7 | 4.1 | 0.7 | 0.5 | 1.3 | 0.08 | 1.12 | 20.8 |
| Example 2 | — | 90.0 | 5.0 | 5.0 | 3.1 | 3.4 | 0.7 | 0.6 | 1.3 | 0.08 | 1.18 | 21.9 |
| Example 3 | — | 85.0 | 10.0 | 5.0 | 4.2 | 3.1 | 0.7 | 0.6 | 1.2 | 0.08 | 1.24 | 24.3 |
| Example 4 | — | 94.5 | 2.5 | 3.0 | 2.1 | 3.1 | 0.7 | 0.6 | 1.2 | 0.08 | 1.22 | 22.0 |
| Example 5 | — | 92.0 | 5.0 | 3.0 | 2.6 | 2.8 | 0.7 | 0.6 | 1.1 | 0.08 | 1.29 | 23.2 |

TABLE 1-continued

| | Ingredients of Resin Composition | | | | Test Results | | | | | | | |
|---|---|---|---|---|---|---|---|---|---|---|---|---|
| | Polyester Resins | | Polyamide | | Transparency | | Domain Size of Polyamide Resin (C) | | | | Gas-Barrier Performance | |
| | | Resin | Resin | Resin | Haze Areal Draw Ratio | | Areal Draw Ratio | | | | | |
| | | | | | | | portion at less than 5 times | | portion at 5 times or more | | Oxygen Trans- | Carbon Dioxide |
| | — PET | (A) PET | (B) PET | Resin (C) | | | | | | | | |
| | (R) (mass %) | (A-1) (mass %) | (B-1) (mass %) | PA1 (mass %) | portion at less than 5 times (%) | portion at 5 times or more (%) | major diameter (μm) | minor diameter (μm) | major diameter (μm) | minor diameter (μm) | mission Coefficient (*1) | Transmission Coefficient (*2) |
| Example 6 | — | 87.0 | 10.0 | 3.0 | 4.1 | 2.5 | 0.7 | 0.6 | 1.2 | 0.08 | 1.35 | 25.8 |
| Comparative Example 1 | 97.0 | — | — | 3.0 | 2.5 | 4.4 | 0.8 | 0.7 | 1.3 | 0.11 | 1.38 | 27.1 |
| Comparative Example 2 | 95.0 | — | — | 5.0 | 3.7 | 7.1 | 0.9 | 0.7 | 1.2 | 0.12 | 1.26 | 25.5 |
| Comparative Example 3 | — | 95.0 | — | 5.0 | 3.6 | 5.1 | 0.7 | 0.6 | 1.1 | 0.08 | 1.07 | 19.5 |
| Comparative Example 4 | — | 75.0 | 20.0 | 5.0 | 5.1 | 2.5 | 0.7 | 0.6 | 1.1 | 0.08 | 1.34 | 27.0 |
| Comparative Example 5 | — | 55.0 | 40.0 | 5.0 | 8.2 | 1.8 | 0.7 | 0.6 | 1.2 | 0.08 | 1.60 | 35.8 |
| Comparative Example 6 | 92.5 | — | 2.5 | 5.0 | 2.8 | 6.2 | 0.8 | 0.7 | 1.3 | 0.11 | 1.28 | 15.8 |
| Comparative Example 7 | 90.0 | — | 5.0 | 5.0 | 3.6 | 5.0 | 0.8 | 0.7 | 1.3 | 0.11 | 1.32 | 26.1 |
| Comparative Example 8 | 85.0 | — | 10.0 | 5.0 | 4.1 | 4.4 | 0.8 | 0.7 | 1.3 | 0.11 | 1.29 | 25.3 |
| Comparative Example 9 | 75.0 | — | 20.0 | 5.0 | 6.5 | 3.1 | 0.8 | 0.7 | 1.3 | 0.11 | 1.34 | 29.4 |
| Comparative Example 10 | 55.0 | — | 40.0 | 5.0 | 9.3 | 2.7 | 0.8 | 0.7 | 1.3 | 0.11 | 1.61 | 35.8 |
| Comparative Example 11 | 100.0 | — | — | — | 0.6 | 0.5 | — | — | — | — | 1.88 | 37.3 |
| Comparative Example 12 | — | 100.0 | — | — | 0.7 | 0.7 | — | — | — | — | 1.88 | 37.4 |
| Comparative Example 13 | — | — | 100.0 | — | 0.7 | 0.6 | — | — | — | — | 4.12 | 88.2 |

(*1) unit of oxygen transmission rate: cc · mm/(m$^2$ · day · 0.21 atm)
(*2) unit of carbon dioxide transmission rate: cc · mm/(m$^2$ · day)

TABLE 2

| | Ingredients of Resin Composition | | | | Test Results | | | | | | | |
|---|---|---|---|---|---|---|---|---|---|---|---|---|
| | Polyester Resins | | Polyamide | | Transparency | | Domain Size of Polyamide Resin (C) | | | | Gas-Barrier Performance | |
| | | Resin | Resin | Resin | Haze Areal Draw Ratio | | Areal Draw Ratio | | | | | |
| | | | | | | | portion at less than 5 times | | portion at 5 times or more | | Oxygen Trans- | Carbon Dioxide |
| | — PET | (A) PET | (B) PET | Resin (C) | | | | | | | | |
| | (R) (mass %) | (A-1) (mass %) | (B-2) (mass %) | PA1 (mass %) | portion at less than 5 times (%) | portion at 5 times or more (%) | major diameter (μm) | minor diameter (μm) | major diameter (μm) | minor diameter (μm) | mission Coefficient (*1) | Transmission Coefficient (*2) |
| Example 7 | — | 92.5 | 2.5 | 5.0 | 2.6 | 4.2 | 0.7 | 0.5 | 1.3 | 0.08 | 1.14 | 21.1 |
| Example 8 | — | 90.0 | 5.0 | 5.0 | 3.0 | 3.5 | 0.7 | 0.6 | 1.3 | 0.08 | 1.20 | 22.2 |
| Example 9 | — | 85.0 | 10.0 | 5.0 | 4.1 | 3.2 | 0.7 | 0.6 | 1.2 | 0.08 | 1.26 | 24.7 |
| Example 10 | — | 94.5 | 2.5 | 3.0 | 2.0 | 3.2 | 0.7 | 0.6 | 1.2 | 0.08 | 1.24 | 22.4 |
| Example 11 | — | 92.0 | 5.0 | 3.0 | 2.5 | 2.9 | 0.7 | 0.6 | 1.1 | 0.08 | 1.31 | 23.6 |
| Example 12 | — | 87.0 | 10.0 | 3.0 | 4.0 | 2.6 | 0.7 | 0.6 | 1.2 | 0.08 | 1.37 | 26.1 |
| Comparative Example 14 | — | 75.0 | 20.0 | 5.0 | 5.0 | 2.6 | 0.7 | 0.6 | 1.1 | 0.08 | 1.36 | 27.4 |
| Comparative Example 15 | — | 55.0 | 40.0 | 5.0 | 8.1 | 1.9 | 0.7 | 0.6 | 1.2 | 0.08 | 1.62 | 36.3 |
| Comparative Example 16 | 92.5 | — | 2.5 | 5.0 | 2.7 | 6.3 | 0.8 | 0.7 | 1.3 | 0.11 | 1.30 | 16.0 |
| Comparative Example 17 | 90.0 | — | 5.0 | 5.0 | 3.5 | 5.1 | 0.8 | 0.7 | 1.3 | 0.11 | 1.34 | 26.5 |

TABLE 2-continued

| | Ingredients of Resin Composition | | | Test Results | | | | | | | |
|---|---|---|---|---|---|---|---|---|---|---|---|
| | Polyester Resins | | Polyamide | Transparency | | Domain Size of Polyamide Resin (C) | | | | Gas-Barrier Performance | |
| | Resin | Resin | Resin | Haze Areal Draw Ratio | | Areal Draw Ratio | | | | Oxygen Trans- | Carbon Dioxide |
| | — | (A) | (B) | | | portion at less than 5 times | | portion at 5 times or more | | | |
| | PET | PET | PET | Resin (C) | | | | | | | |
| | (R) (mass %) | (A-1) (mass %) | (B-2) (mass %) | PA1 (mass %) | portion at less than 5 times (%) | portion at 5 times or more (%) | major diameter (μm) | minor diameter (μm) | major diameter (μm) | minor diameter (μm) | mission Coefficient (*1) | Transmission Coefficient (*2) |
| Comparative Example 18 | 85.0 | — | 10.0 | 5.0 | 4.0 | 4.5 | 0.8 | 0.7 | 1.3 | 0.11 | 1.31 | 25.7 |
| Comparative Example 19 | 75.0 | — | 20.0 | 5.0 | 6.4 | 3.2 | 0.8 | 0.7 | 1.3 | 0.11 | 1.36 | 29.8 |
| Comparative Example 20 | 55.0 | — | 40.0 | 5.0 | 9.2 | 2.8 | 0.8 | 0.7 | 1.3 | 0.11 | 1.63 | 36.3 |
| Comparative Example 21 | — | — | 100.0 | — | 0.7 | 0.6 | — | — | — | — | 4.18 | 89.5 |

(*1) unit of oxygen transmission rate: cc · mm/(m² · day · 0.21 atm)
(*2) unit of carbon dioxide transmission rate: cc · mm/(m² · day)

TABLE 3

| | Ingredients of Resin Composition | | | | | Test Results | | | | | | |
|---|---|---|---|---|---|---|---|---|---|---|---|---|
| | Polyester Resins | | | | Polyamide | Transparency | | Domain Size of Polyamide Resin (C) | | | | Gas-Barrier Performance |
| | Resin | Resin | Resin | Resin | Resin | Haze Areal Draw Ratio | | Areal Draw Ratio | | | | Oxygen Trans- mission Coefficient (after 90 days) (*1) | Carbon Dioxide Trans- mission Coefficient (*2) |
| | — | (A) | (A) | (B) | (C) | | | portion at less than 5 times | | portion at 5 times or more | | | |
| | PET | PET | PET | PET | | | | | | | | | |
| | (R) (mass %) | (A-1) (mass %) | (A-2) (mass %) | (B-1) (mass %) | PA1 (mass %) | portion at less than 5 times (%) | portion at 5 times or more (%) | major diameter (μm) | minor diameter (μm) | major diameter (μm) | minor diameter (μm) | | |
| Example 13 | — | — | 92.5 | 2.5 | 5.0 | 2.7 | 4.1 | 0.7 | 0.5 | 1.3 | 0.08 | 0.02 | 20.9 |
| Example 14 | — | — | 90.0 | 5.0 | 5.0 | 3.1 | 3.4 | 0.7 | 0.6 | 1.3 | 0.08 | 0.02 | 21.9 |
| Example 15 | — | — | 85.0 | 10.0 | 5.0 | 4.2 | 3.1 | 0.7 | 0.6 | 1.2 | 0.08 | 0.02 | 24.4 |
| Example 16 | — | — | 94.5 | 2.5 | 3.0 | 2.1 | 3.1 | 0.7 | 0.6 | 1.2 | 0.08 | 0.02 | 22.1 |
| Example 17 | — | — | 92.0 | 5.0 | 3.0 | 2.6 | 2.8 | 0.7 | 0.6 | 1.1 | 0.08 | 0.02 | 23.2 |
| Example 18 | — | — | 87.0 | 10.0 | 3.0 | 4.1 | 2.5 | 0.7 | 0.6 | 1.2 | 0.08 | 0.02 | 25.8 |
| Comparative Example 22 | — | — | 95.0 | — | 5.0 | 3.6 | 5.1 | 0.7 | 0.6 | 1.1 | 0.08 | 0.02 | 19.6 |
| Comparative Example 23 | — | — | 75.0 | 20.0 | 5.0 | 5.1 | 2.5 | 0.7 | 0.6 | 1.1 | 0.08 | 0.02 | 27.0 |
| Comparative Example 24 | — | — | 55.0 | 40.0 | 5.0 | 8.2 | 1.8 | 0.7 | 0.6 | 1.2 | 0.08 | 0.02 | 35.8 |
| Comparative Example 25 | — | — | 100.0 | — | — | 0.7 | 0.7 | — | — | — | — | 1.89 | 37.6 |

(*1) unit of oxygen transmission coefficient: cc · mm/(m² · day · 0.21 atm)
(*2) unit of carbon dioxide transmission coefficient: cc · mm/(m² · day)

The bottles produced using the resin composition of the present invention in Examples 1 to 18 all had a low haze and were excellent in transparency in any portion thereof where the stretching draw ratio was 5 times or more or was less than 5 times, and in addition, the bottles all had good "passive" gas-barrier performance. In particular, the bottles produced using the resin composition of the present invention in Examples 13 to 18 were not only excellent in transparency but also exhibited excellent oxygen absorbability.

On the other hand, the bottles produced in Comparative Examples 1, 2, 3 and 22 using a resin composition not containing the polyester resin (B) had poor transparency in the portion thereof where the stretching draw ratio was 5 times or more.

In Comparative Examples 4, 5, 14, 15, 23 and 24, the amount of the polyester resin (B) incorporated in the resin composition was large, and therefore, the produced bottles had good transparency in the portion thereof where the stretching draw ratio was 5 times or more, but had poor transparency in the portion thereof where the stretching draw ratio was less than 5 times.

In Comparative Examples 6, 7, 8, 16, 17 and 18, a resin composition using a polyester (R) not containing a sulfoisophthalic acid unit and a sulfoisophthalic acid metal salt unit, in place of the polyester resin (A), was used, and therefore the transparency of the produced bottles in the portion thereof where the stretching draw ratio was 5 times or more was worse than that of the bottles in Examples.

In the case where a resin composition using a polyester (R) not containing a sulfoisophthalic acid unit and sulfoisophthalic acid metal salt unit in place of the polyester resin (A), and where the amount of the polyester resin (B) incorporated in the resin composition was increased, as in Comparative Examples 9, 10, 19 and 20, the transparency of the produced PET bottles in the portion thereof where the stretching draw ratio was 5 times or more was bettered but was poor in the portion thereof where the draw ratio was less than 5 times.

In Comparative Examples 11, 12, 13, 21 and 25, a resin composition not containing the polyamide resin (C) was used, and therefore the gas-barrier performance of the produced bottles was poor.

The resin composition and the molded article of the present invention satisfy both excellent gas-barrier performance and excellent transparency, and are useful as sheets, films, containers such as bottles, cups, etc., and also as various molded products, composite materials (for example, multilayer films, multilayer containers), etc.

The invention claimed is:

1. A polyester-based resin composition comprising a polyester resin (A) that has a dicarboxylic acid unit containing units selected from a sulfophthalic acid unit and a sulfophthalic acid metal salt unit in a total amount of 0.01 to 15.0 mol % based on the dicarboxylic acid unit and a diol unit, a polyester resin (B) having a cyclic acetal structure or an alicyclic hydrocarbon structure, and a polyamide resin (C),
    wherein the content of the polyester resin (A) in the resin composition is 87.0 to 99.0% by mass based on the resin composition, the content of the polyester resin (B) in the resin composition is 0.5 to 10.0% by mass based on the resin composition, and the content of the polyamide resin (C) in the resin composition is 0.5 to 3.0% by mass based on the resin composition.

2. The polyester-based resin composition according to claim 1, wherein the polyester resin (A) has a dicarboxylic acid unit containing units selected from a sulfoisophthalic acid unit and a sulfoisophthalic acid metal salt unit in a total amount of 0.01 to 15.0 mol % based on the dicarboxylic acid unit and a terephthalic acid unit in an amount of 70 mol % or more based on the dicarboxylic acid unit, and a diol unit containing an aliphatic glycol unit having 2 to 24 carbon atoms in an amount of 70 mol % or more based on the diol unit.

3. The polyester-based resin composition according to claim 1, wherein the polyester resin (A) has a dicarboxylic acid unit containing a sulfoisophthalic acid metal salt unit in an amount of 0.01 to 15.0 mol % based on the dicarboxylic acid unit, an isophthalic acid unit in an amount of 1 to 10 mol % based on the dicarboxylic acid unit and a terephthalic acid unit in an amount of 70 mol % or more based on the dicarboxylic acid unit, and a diol unit containing an aliphatic glycol unit having 2 to 6 carbon atoms in an amount of 70 mol % or more based on the diol unit.

4. The polyester-based resin composition according to claim 1, wherein the polyester resin (B) is a polyester resin having at least one of a dicarboxylic acid unit having a cyclic acetal structure and a diol unit having a cyclic acetal structure.

5. The polyester-based resin composition according to claim 4, wherein the diol unit having a cyclic acetal structure is derived from a compound represented by the following formula (1) or (2):

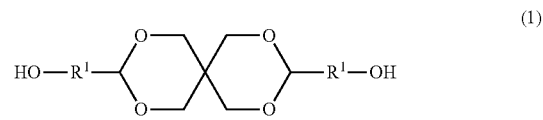

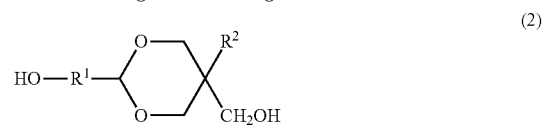

wherein $R^1$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms; and $R^2$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

6. The polyester-based resin composition according to claim 4, wherein the dicarboxylic acid unit having a cyclic acetal structure is derived from a compound represented by the following formula (3) or (4):

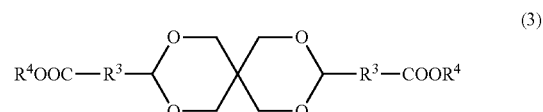

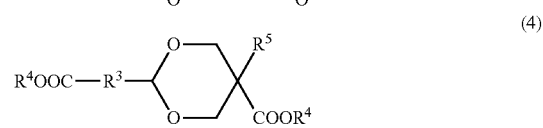

wherein $R^3$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms, $R^4$ each independently represents a hydrogen atom, a methyl group, an ethyl group, or an isopropyl group; and $R^5$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

7. The polyester-based resin composition according to claim 1, wherein the polyester resin (B) is a polyester resin having at least one of a dicarboxylic acid unit having an alicyclic hydrocarbon structure and a diol unit having an alicyclic hydrocarbon structure.

8. The polyester-based resin composition according to claim 7, wherein the alicyclic hydrocarbon structure is a cycloalkane structure having 3 to 10 carbon atoms.

9. The polyester-based resin composition according to claim 7, wherein the diol unit having an alicyclic hydrocarbon structure is derived from a compound represented by the following formula (5):

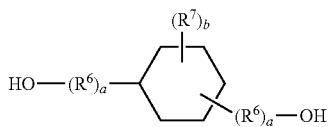

(5)

wherein $R^6$ each independently represents a divalent aliphatic group having 1 to 10 carbon atoms; $R^7$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms; a indicates 0 or 1, and when a=0, the hydroxyl group directly bonds to the cyclohexane ring; and b indicates an integer of 0 to 4.

10. The polyester-based resin composition according to claim 7, wherein the dicarboxylic acid unit having an alicyclic hydrocarbon structure is derived from a compound represented by the following formula (6):

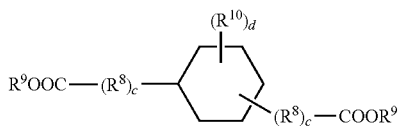

(6)

wherein $R^8$ each independently represents a divalent aliphatic group having 1 to 10 carbon atoms; $R^9$ each independently a hydrogen atom, a methyl group, an ethyl group, or an isopropyl group; $R^{10}$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms; c indicates 0 or 1, and when c=0, the group —COOR$^9$ directly bonds to the cyclohexane ring; and d indicates an integer of 0 to 4.

11. The polyester-based resin composition according to claim 1, wherein the polyamide resin (C) is a polyamide resin (C1) that has a diamine unit containing a metaxylylenediamine unit in an amount of 70 mol % or more based on the diamine unit and a dicarboxylic acid unit containing an α,ω-aliphatic dicarboxylic acid unit in an amount of 70 mol % or more based on the carboxylic acid unit.

12. A molded article having at least one layer formed of the polyester-based resin composition of claim 1.

13. The molded article according to claim 12, which is a bottle, a cup, a film or a sheet.

14. The molded article according to claim 12, wherein the molded article has a portion stretched in a draw ratio of 5 to 20 times.

15. The molded article according to claim 14, wherein the number average value of the major diameter of the disperse particles of the polyamide resin (C) in the portion stretched by 5 to 20 times is 1.0 to 8.0 μm and the number average value of the minor diameter thereof is 0.01 to 0.50 μm.

* * * * *